(12) United States Patent
Zhou et al.

(10) Patent No.: US 11,122,116 B2
(45) Date of Patent: Sep. 14, 2021

(54) LOAD BALANCING SYSTEM, METHOD, AND APPARATUS

(71) Applicant: Huawei Technologies Co., Ltd., Shenzhen (CN)

(72) Inventors: Jun Zhou, Nanjing (CN); Xia Zhu, Nanjing (CN); Ji Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 16/587,915

(22) Filed: Sep. 30, 2019

(65) Prior Publication Data

US 2020/0028899 A1    Jan. 23, 2020

Related U.S. Application Data

(63) Continuation of application No. PCT/CN2017/120212, filed on Dec. 29, 2017.

(30) Foreign Application Priority Data

Mar. 31, 2017  (CN) .......................... 201710210891.7

(51) Int. Cl.
   *H04L 29/08*     (2006.01)
   *H04L 9/08*      (2006.01)
   (Continued)

(52) U.S. Cl.
   CPC ........ *H04L 67/1014* (2013.01); *H04L 9/0816* (2013.01); *H04L 9/3213* (2013.01);
   (Continued)

(58) Field of Classification Search
   CPC ............. H04L 67/1014; H04L 67/1036; H04L 9/0816; H04L 9/3213; H04L 69/163; H04L 69/24
   See application file for complete search history.

(56) References Cited

U.S. PATENT DOCUMENTS 10,405,246 B2*   9/2019  Huang .................. H04L 41/046
2012/0331160 A1* 12/2012  Tremblay .............. H04L 69/163
                                                  709/228

(Continued)

FOREIGN PATENT DOCUMENTS

CN       104243443 A    12/2014
CN       105282211 A     1/2016
(Continued)

OTHER PUBLICATIONS

Ford, A., et al., "TCP Extensions for Multipath Operation with Multiple Addresses," RFC 6824, Jan. 2013, 64 pages.

*Primary Examiner* — Sm A Rahman
(74) *Attorney, Agent, or Firm* — Conley Rose, P.C.

(57) ABSTRACT

A load balancing system, method, and apparatus, where the method includes: receiving, by a load balancing device, a first message from a client that is used to request to establish a first Transmission Control Protocol (TCP) connection; sending the first message to a server; receiving a second message from the client that is used to request to establish a second TCP connection; and determining, based on a token of the server included in the second message, that a destination device of the second message is the server, and sending the second message to the server, in order to establish the second TCP connection between the client and the server.

20 Claims, 14 Drawing Sheets

(51) Int. Cl.
*H04L 9/32* (2006.01)
*H04L 29/06* (2006.01)

(52) U.S. Cl.
CPC ........ *H04L 67/1036* (2013.01); *H04L 69/163* (2013.01); *H04L 69/24* (2013.01)

(56) References Cited

U.S. PATENT DOCUMENTS

| | | | |
|---|---|---|---|
| 2015/0281367 A1* | 10/2015 | Nygren | H04L 65/1066 709/228 |
| 2015/0350337 A1 | 12/2015 | Biswas | |
| 2016/0218960 A1 | 7/2016 | Sundarababu et al. | |
| 2016/0309534 A1 | 10/2016 | Teyeb et al. | |
| 2016/0373533 A1 | 12/2016 | Biswas et al. | |
| 2017/0063699 A1 | 3/2017 | Kim | |

FOREIGN PATENT DOCUMENTS

| | | |
|---|---|---|
| CN | 105915466 A | 8/2016 |
| EP | 3085192 A1 | 10/2016 |
| WO | 2016155826 A1 | 10/2016 |

\* cited by examiner

LOAD BALANCING SYSTEM, METHOD, AND APPARATUS

CROSS-REFERENCE TO RELATED APPLICATIONS

This application is a continuation of International Patent Application No. PCT/CN2017/120212, filed on Dec. 29, 2017, which claims priority to Chinese Patent Application No. 201710210891.7, filed on Mar. 31, 2017. The disclosures of the aforementioned applications are hereby incorporated by reference in their entireties.

TECHNICAL FIELD

This application relates to the field of computer technologies, and in particular, to a load balancing system, method, and apparatus.

BACKGROUND

Multipath Transmission Control Protocol (MPTCP) is a transport layer protocol in which a plurality of paths are used for concurrent transmission, which can improve an end-to-end throughput and increase network utilization.

As shown in FIG. 1, MPTCP works at layer 4 of the Transmission Control Protocol/Internet Protocol (TCP/IP). At the conventional layer 4, a multipath processing module is newly added between a TCP protocol stack and an existing socket of an application layer interface. In this way, a multipath TCP processing capability is implemented, and an application layer program change can be avoided.

Load balancing is a clustering technology that distributes specific services such as a network service and network traffic to a plurality of network devices (including a server, a firewall, and the like) or a plurality of links, in order to improve service processing capabilities, thereby ensuring high service reliability.

In a conventional layer 4 load balancing technology, a TCP connection establishment message is forwarded using a 5-tuple (a transmit end IP address, a transmit end port, a receive end IP address, a receive end port, and a transport layer protocol) of a TCP flow, in order to ensure that link establishment messages of a same TCP connection are all forwarded to a same server.

However, in an MPTCP scenario, one MPTCP connection includes a plurality of TCP connections, and there is no relationship between 5-tuples of the TCP connections. If a conventional load balancing mechanism is followed, after a first TCP connection is established, a link establishment message of a second TCP connection is forwarded to a server different from that of the first TCP connection because a 5-tuple of the subsequent second TCP connection is different from a 5-tuple of the first TCP connection. In this case, the server that receives the second TCP connection cannot successfully establish the second TCP connection because related information of the first TCP connection cannot be obtained. Consequently, an MPTCP mechanism does not work, and communication efficiency is low.

SUMMARY

Embodiments of this application provide a load balancing system, method, and apparatus, in order to resolve a problem that an MPTCP mechanism does not work, and communication efficiency is low because TCP connections of a same MPTCP connection cannot be identified in an existing load balancing mechanism.

The technical solutions provided in the embodiments of this application are as follows.

According to a first aspect, a load balancing system is provided. The load balancing system includes a client, a server, and a load balancing device. The client is configured to: send, to a server using a load balancing device, a first message used to request to establish a first TCP connection; receive a response message that is of the first message and that is sent by the server; and send, to the load balancing device, a second message that is used to request to establish a second TCP connection, where the response message of the first message includes a key of the server and a first function, the first function is used to calculate a token of the server based on the key of the server, the second message includes the token that is of the server and that is calculated by the client based on the key of the server using the first function, and the second TCP connection and the first TCP connection belong to a same MPTCP session. The server is configured to: receive the first message that is sent by the client using the load balancing device and that is used to request to establish the first TCP connection; and send the response message of the first message to the client. The load balancing device is configured to: receive the first message that is sent by the client and that is used to request to establish the first TCP connection; send the first message to the server; receive the second message that is sent by the client and that is used to request to establish the second TCP connection; determine, based on the token of the server included in the second message, that a destination device of the second message is the server; and send the second message to the server, in order to establish the second TCP connection between the client and the server.

According to the load balancing system, after the first TCP connection is established, for the second TCP connection, a token field of the server included in the second message that is used to establish the second TCP connection is identified, such that a server that is the same as that of the first TCP connection is determined, and the second TCP connection is forwarded to the server that is the same as that of the first TCP connection. In this way, load balancing in an MPTCP scenario can be implemented. This not only can implement load balancing of a service and improve a service processing capability, but also can take advantage of multipath transmission control, improve an end-to-end throughput rate, and increase network utilization, thereby improving communication efficiency.

With reference to the first aspect, in a possible design, the server is further configured to calculate the token of the server based on a number of the server using a second function, and calculate the key of the server based on the token of the server using the first function.

In this design, numbers of servers are different, and the tokens of the servers are calculated using different numbers. Therefore, it can be ensured that the following problem can be avoided: a conflict occurs because different servers generate a same token.

With reference to the first aspect, in a possible design, the server is configured to calculate the token of the server based on the number of the server and a first key using the second function, where the first key is a key negotiated between the server and the load balancing device.

In this design, numbers of servers are different, and the tokens of the servers are generated using different numbers, the first key, and the second function. Therefore, it can be ensured that the following problem can be avoided: a conflict occurs because different servers generate a same token. Further, because the first key is used to generate the token, security of token information can be ensured.

With reference to the first aspect, in a possible design, the load balancing device is configured to calculate a number of the server based on the token of the server, and determine that the destination device of the second message is the server corresponding to the number.

With reference to the first aspect, in a possible design, the second function is a function negotiated between the server and the load balancing device.

According to a second aspect, a load balancing method is provided. The load balancing method includes: receiving, by a server, a first message that is sent by a client using a load balancing device and that is used to request to establish a first TCP connection; and sending, by the server, a response message of the first message to the client. The response message of the first message includes a key of the server and a first function, and the first function is used by the client to calculate a token of the server based on the key of the server, in order to establish, based on the token of the server, a second TCP connection that is to the server and that belongs to a same MPTCP session as the first TCP connection.

In this design, the server uses a special manner of generating a token and a key. Therefore, it is ensured that the load balancing device can implement uniform load balancing among different TCP subflows of an MPTCP primary connection.

With reference to the second aspect, in a possible design, before the sending, by the server, a response message of the first message to the client, the method further includes: calculating, by the server, the token of the server based on a number of the server using a second function; and calculating the key of the server based on the token of the server using the first function, where the second function is a function negotiated between the server and the load balancing device.

In this design, numbers of servers are different, and the tokens of the servers are calculated using different numbers. Therefore, it can be ensured that the following problem can be avoided: a conflict occurs because different servers generate a same token.

With reference to the second aspect, in a possible design, the calculating, by the server, the token of the server based on a number of the server using a second function includes calculating, by the server, the token of the server based on the number of the server and a first key using the second function, where the first key is a key negotiated between the server and the load balancing device.

In this design, numbers of servers are different, and the tokens of the servers are generated using different numbers, the first key, and the second function. Therefore, it can be ensured that the following problem can be avoided: a conflict occurs because different servers generate a same token. Further, because the first key is used to generate the token, security of token information can be ensured.

According to a third aspect, a load balancing method is provided. The load balancing method includes: sending, by a client, to a server using a load balancing device, a first message used to request to establish a first TCP connection; receiving, by the client, a response message that is of the first message and that is sent by the server, where the response message of the first message includes a key of the server and a first function, and the first function is used to calculate a token of the server based on the key of the server; and calculating, by the client, the token of the server based on the key of the server using the first function; and sending, to the load balancing device, a second message used to request to establish a second TCP connection. The second message includes the token of the server, where the token of the server is used by the load balancing device to determine that a destination device of the second message is the server, in order to establish the second TCP connection between the client and the server, where the second TCP connection and the first TCP connection belong to a same MPTCP session.

In this design, after the first TCP connection is successfully established, for the second TCP connection, a token field of the server included in the second message that is used to establish the second TCP connection is calculated. Additionally, the second message that is used to establish the second TCP connection and that carries the token is sent to the load balancing device, such that the second TCP connection is forwarded to a server that is the same as that of the first TCP connection, load balancing in an MPTCP scenario can be implemented, and communication efficiency is improved, thereby increasing network utilization.

According to a fourth aspect, a load balancing method is provided. The load balancing method includes: receiving, by a load balancing device, a first message that is sent by a client and that is used to request to establish a first TCP connection; sending, by the load balancing device, the first message to a server; receiving, by the load balancing device, a second message that is sent by the client and that is used to request to establish a second TCP connection, where the second TCP connection and the first TCP connection belong to a same MPTCP session, and the second message includes a token of the server; determining, by the load balancing device based on the token of the server included in the second message, that a destination device of the second message is the server; and sending the second message to the server, in order to establish the second TCP connection between the client and the server.

In this design, for the first TCP connection, the load balancing device maintains a conventional load balancing manner. For the second TCP connection, the load balancing device identifies a token field of the server included in the second message that is used to establish the second TCP connection, such that a server that is the same as that of the first TCP connection is determined, and the second TCP connection is forwarded to the server that is the same as that of the first TCP connection. In this way, load balancing in an MPTCP scenario can be implemented. This not only can implement load balancing of a service and improve a service processing capability, but also can take advantage of multipath transmission control, improve an end-to-end throughput rate, and increase network utilization, thereby improving communication efficiency.

With reference to the fourth aspect, in a possible design, the determining, by the load balancing device based on the token of the server included in the second message, that a destination device of the second message is the server includes: calculating, by the load balancing device, a number of the server based on the token of the server; and determining that the destination device of the second message is the server corresponding to the number.

In this design, the token of the server is identified, and a number of a server in which the first TCP connection is located is calculated, such that the second TCP connection is forwarded to a server that is the same as that of the first TCP connection based on the number that is of the server and that is obtained through calculation, thereby implementing load balancing among different TCP flows.

With reference to the fourth aspect, in a possible design, the calculating, by the load balancing device, a number of the server based on the token of the server includes calculating, by the load balancing device, the number of the server based on the token of the server using a function negotiated between the load balancing device and the server.

According to a fifth aspect, a load balancing apparatus is provided. The load balancing apparatus is applied to a server and includes: a receiving unit configured to receive a first message that is sent by a client using a load balancing device and that is used to request to establish a first TCP connection; a processing unit configured to generate a response message of the first message based on the first message; and a sending unit configured to send the response message of the first message to the client. The response message of the first message includes a key of the server and a first function, and the first function is used by the client to calculate a token of the server based on the key of the server, in order to establish, based on the token of the server, a second TCP connection that is to the server and that belongs to a same MPTCP session as the first TCP connection.

With reference to the fifth aspect, in a possible design, the processing unit is further configured to: calculate the token of the server based on a number of the server using a second function; and calculate the key of the server based on the token of the server using the first function, where the second function is a function negotiated between the server and the load balancing device.

With reference to the fifth aspect, in a possible design, when calculating the token of the server based on the number of the server using the second function, the processing unit is configured to calculate the token of the server based on the number of the server and a first key using the second function, where the first key is a key negotiated between the server and the load balancing device.

According to a sixth aspect, a load balancing apparatus is provided. The load balancing apparatus is applied to a client and includes: a sending unit configured to send, to a server using a load balancing device, a first message used to request to establish a first TCP connection; a receiving unit configured to receive a response message that is of the first message and that is sent by the server, where the response message of the first message includes a key of the server and a first function, and the first function is used to calculate a token of the server based on the key of the server; and a processing unit configured to: calculate the token of the server based on the key of the server using the first function; and send, to the load balancing device, a second message used to request to establish a second TCP connection. The second message includes the token of the server, where the token of the server is used by the load balancing device to determine that a destination device of the second message is the server, in order to establish the second TCP connection between the client and the server, and the second TCP connection and the first TCP connection belong to a same MPTCP session.

According to a seventh aspect, a load balancing apparatus is provided. The load balancing apparatus including: a receiving unit configured to receive a first message that is sent by a client and that is used to request to establish a first TCP connection; and a sending unit configured to send the first message to a server, where the receiving unit is further configured to receive a second message that is sent by the client and that is used to request to establish a second TCP connection, where the second TCP connection and the first TCP connection belong to a same MPTCP session, and the second message includes a token of the server; and a processing unit configured to: determine, based on the token of the server included in the second message, that a destination device of the second message is the server; and send the second message to the server, in order to establish the second TCP connection between the client and the server.

With reference to the seventh aspect, in a possible design, when determining, based on the token of the server included in the second message, that the destination device of the second message is the server, the processing unit is configured to: calculate a number of the server based on the token of the server; and determine that the destination device of the second message is the server corresponding to the number.

With reference to the seventh aspect, in a possible design, when calculating the number of the server based on the token of the server, the processing unit is configured to calculate the number of the server based on the token of the server using a function negotiated between the load balancing device and the server.

According to an eighth aspect, a server is provided. The server includes a processor, a memory, a receiver, and a transmitter. The memory stores a computer readable program, and the processor controls the receiver and the transmitter by running the program in the memory, in order to implement the load balancing method in the second aspect.

For a problem-resolving principle and beneficial effects of the server, refer to the load balancing method according to any one of the second aspect or the possible implementations of the second aspect, and the resulting beneficial effects. Therefore, for implementation of the server, refer to the load balancing method according to any one of the second aspect or the possible implementations of the second aspect. Repeated parts are not described.

According to a ninth aspect, a client is provided. The client includes a processor, a memory, a receiver, and a transmitter. The memory stores a computer readable program, and the processor controls the receiver and the transmitter by running the program in the memory, in order to implement the load balancing method in the third aspect.

For a problem-resolving principle and beneficial effects of the client, refer to the load balancing method according to any one of the third aspect or the possible implementations of the third aspect, and the resulting beneficial effects. Therefore, for implementation of the client, refer to the load balancing method according to any one of the third aspect or the possible implementations of the third aspect. Repeated parts are not described.

According to a tenth aspect, a load balancing device is provided. The load balancing device includes a processor, a memory, a receiver, and a transmitter. The memory stores a computer readable program, and the processor controls the receiver and the transmitter by running the program in the memory, in order to implement the load balancing method in the fourth aspect.

For a problem-resolving principle and beneficial effects of the load balancing device, refer to the load balancing method according to any one of the fourth aspect or the possible implementations of the fourth aspect, and the resulting beneficial effects. Therefore, for implementation of the load balancing device, refer to the load balancing method according to any one of the fourth aspect or the possible implementations of the fourth aspect. Repeated parts are not described.

According to an eleventh aspect, a computer storage medium is provided. The storage medium is a computer readable storage medium. The computer readable storage medium stores a program. The program includes an instruction. When the instruction is executed by an electronic device having a processor, the electronic device performs the load balancing method in the second aspect and the possible implementations of the second aspect.

According to a twelfth aspect, a computer storage medium is provided. The storage medium is a computer readable storage medium. The computer readable storage medium stores a program. The program includes an instruction. When the instruction is executed by an electronic device having a processor, the electronic device performs the uplink transmission method in the third aspect and the possible implementations of the third aspect.

According to a thirteenth aspect, a computer storage medium is provided. The storage medium is a computer readable storage medium. The computer readable storage medium stores a program. The program includes an instruction. When the instruction is executed by an electronic device having a processor, the electronic device performs the uplink transmission method in the fourth aspect and the possible implementations of the fourth aspect.

DESCRIPTION OF EMBODIMENTS

The following clearly describes the technical solutions in the embodiments of this application with reference to the accompanying drawings in the embodiments of this application.

"A plurality of" mentioned in this application means "two or more".

Figure 1:
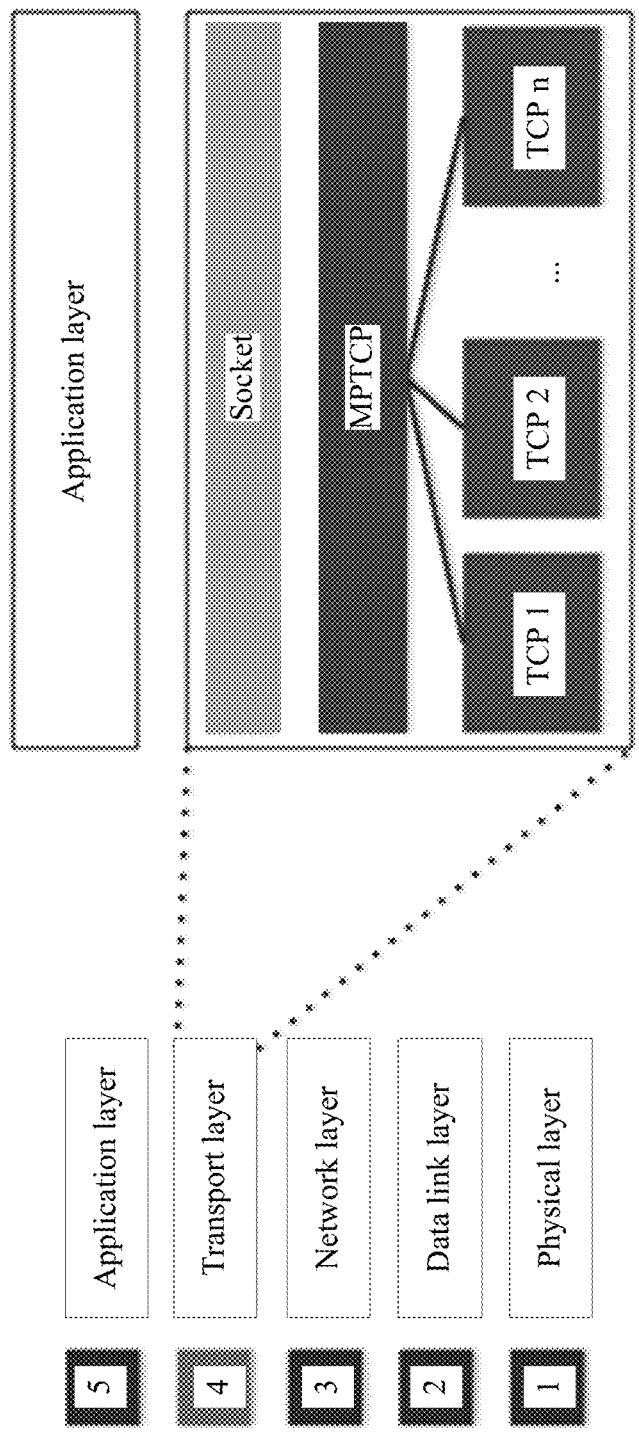
FIG. 1 is a schematic diagram of operation layers of MPTCP.
Figure 2A:
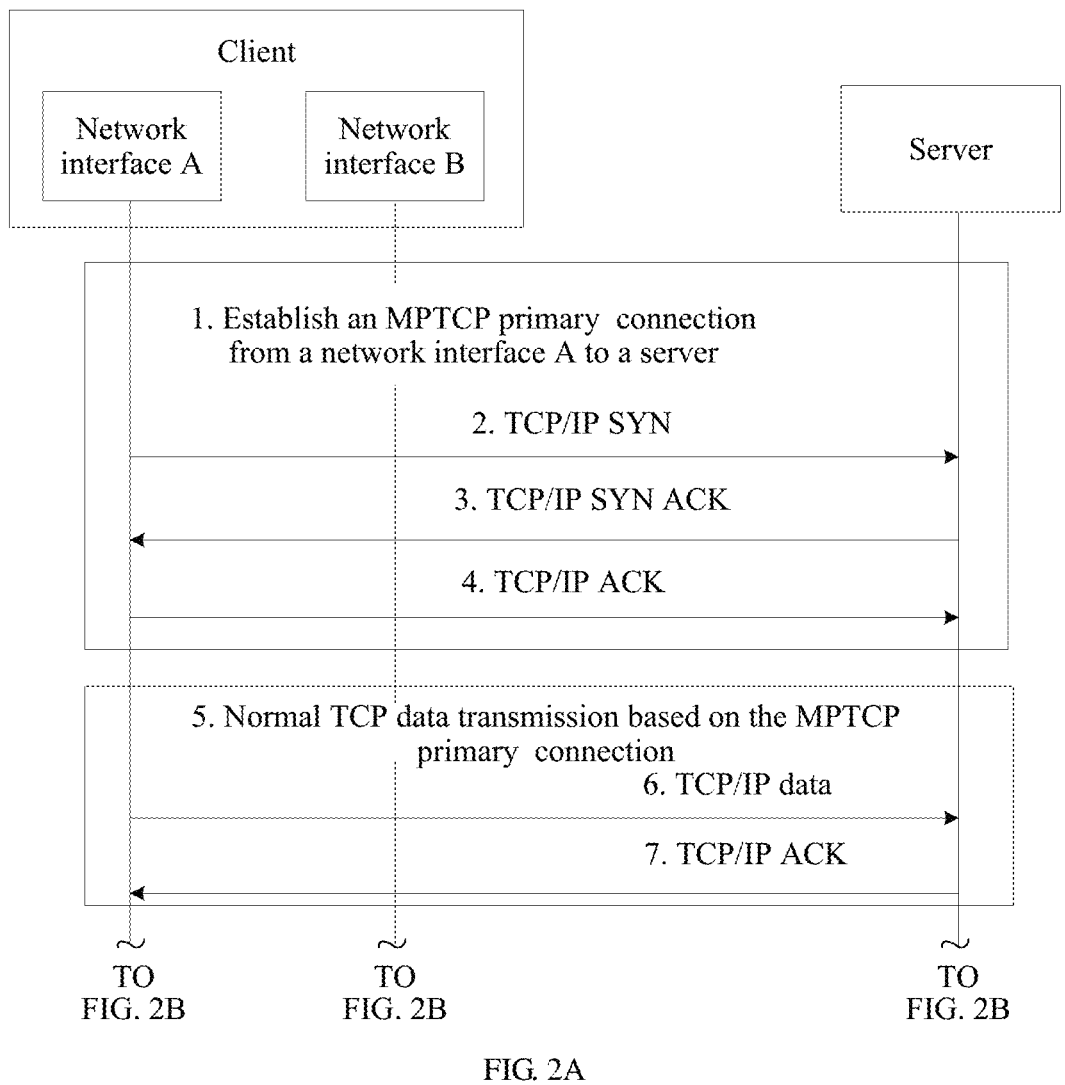
FIG. 2A and FIG. 2B are schematic flowcharts of exchanging connection establishment messages of MPTCP.
Figure 2B:
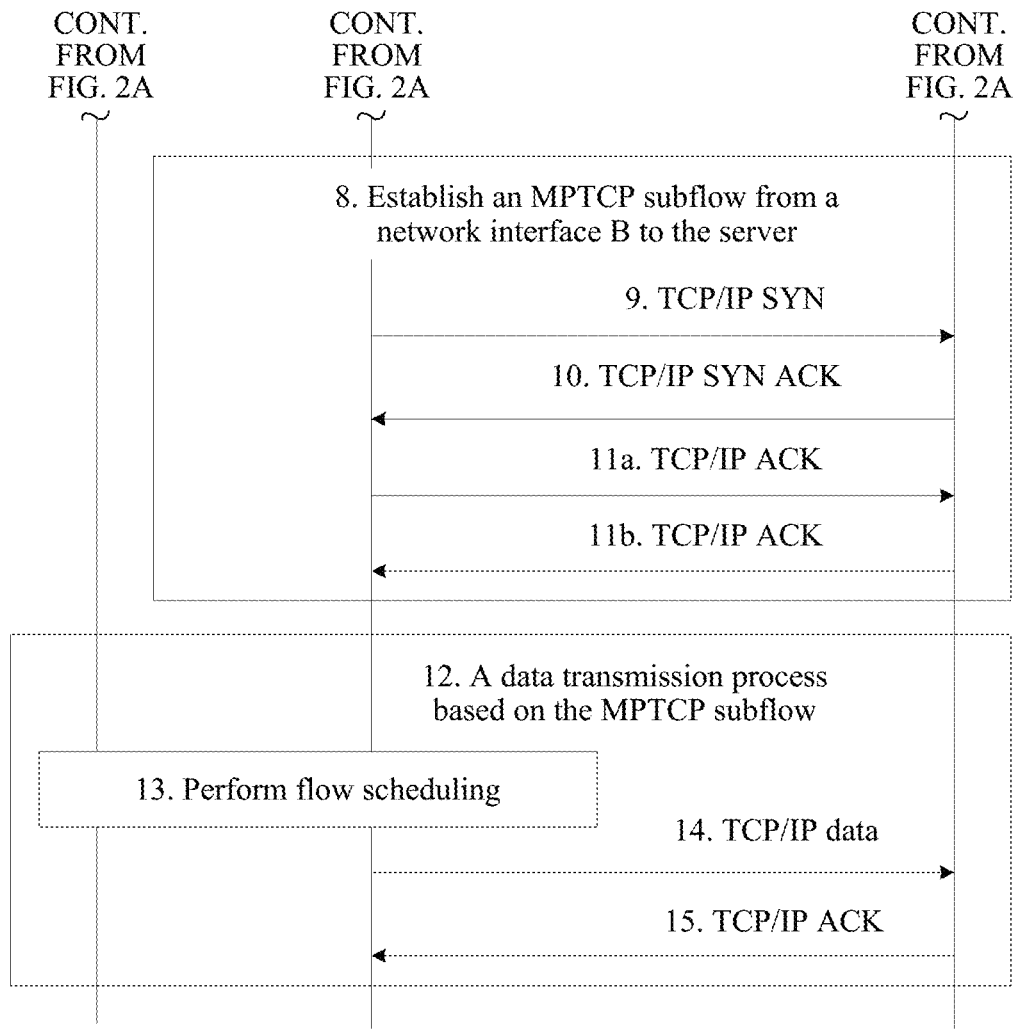

FIG. 2A and FIG. 2B are schematic flowcharts of exchanging connection establishment messages of MPTCP. As shown in FIG. 2A and FIG. 2B, two devices are mainly used in the procedure: a client and a server. The client includes two network interfaces: a network interface A and a network interface B. Optionally, the network interface A may be a Wi-Fi network interface, and the network interface B may be a Long Term Evolution (LTE) network interface. This is merely used as an example for description, and no specific limitation is imposed herein. It should be noted that, herein, that the client includes two network interfaces is merely used as an example for description, and a quantity of network interfaces is not specifically limited. Optionally, the quantity of network interfaces may be one or more. In this application, that the client includes two network interfaces is used as an example for description. If only one network interface is included, a plurality of TCP connections may be established using the only one network port. If three network interfaces are included, a process of establishing a third TCP connection is similar to that of establishing a second network interface, and details are not described in this application again.

Message exchange steps are as follows.

1. Establish an MPTCP primary connection from the network interface A (such as the Wi-Fi network interface) of the client to the server. This is a range of messages, including messages 2, 3, and 4. This part is very similar to a three-way handshake process of establishing a TCP link.

2. A TCP/IP handshake signal (e.g., a synchronize (SYN) message). An MP_CAPABLE field needs to be carried in the message 2, and is used to indicate that the client supports an MPTCP connection. The MP_CAPABLE field includes a key of the client.

3. A TCP/IP handshake signal acknowledgement (e.g., a TCP/IP synchronize-acknowledgment (SYN-ACK) message). The MP_CAPABLE field needs to be carried in the message 3, and is used to indicate that the server supports an MPTCP connection. The MP_CAPABLE field includes a key of the server.

4. A TCP/IP acknowledgement (TCP/IP ACK). The MP_CAPABLE field needs to be carried in the message 4. The MP_CAPABLE field includes the key of the client and the key of the server. The MP_CAPABLE field is used to indicate that both the client and the server support the MPTCP connection. In this case, the three-way handshake establishment process is completed, and the MPTCP primary connection is successfully established.

5. A normal TCP data transmission process based on the MPTCP primary connection. This is a range of messages, including messages 6 and 7.

6. TCP/IP data. The message 6 represents data sent from the client to the server.

7. TCP/IP ACK. The message 7 indicates that the server replies to the client and has received the data sent by the client.

8. Establish an MPTCP subflow from the network interface B (such as the LTE network interface) of the client to the server in a four-way handshake manner. This is a range of messages, including messages 9, 10, 11a, and 11b. This part is very similar to the three-way handshake process of establishing a TCP link.

9. TCP/IP SYN. MP_JOIN field needs to be carried in the message 9. The MP_JOIN field is used to indicate that the client supports the MPTCP connection. The MP_JOIN field includes a token (token-S) of the server, which is used to indicate that the subflow and the primary connection established in the first part belong to a same MPTCP session.

10. TCP/IP SYN ACK. The MP_JOIN field needs to be carried in the message 10. The MP_JOIN field includes authentication information of the server.

11a. TCP/IP ACK. The MP_JOIN field needs to be carried in the message 11a. The MP_JOIN field includes authentication information of the client.

11b. TCP/IP ACK. The message 11b is an ACK message of a TCP standard, and is used to confirm the message 11a. In this case, after the four-way handshake, the MPTCP subflow is successfully established.

12. A data transmission process based on the MPTCP subflow. This is a range of messages, including messages 13, 14, and 15.

13. Perform scheduling before data is sent on an MPTCP layer, and then determine which TCP flow in the primary connection and the subflow is used as a data sending link.

14. TCP/IP data. The message 14 indicates that a segment of data is sent from the client to the server using a subflow.

15. TCP/IP ACK. The message 15 represents acknowledgement of the message 14.

It should be noted that only one example is given in FIG. 2A and FIG. 2B to describe an establishment process of an MPTCP subflow (steps 8 to 11b in FIG. 2A and FIG. 2B). MPTCP supports any subflow. A new subflow establishment manner is the same as the procedure of steps 8, 9, 10, 11a, and 11b in FIG. 2A and FIG. 2B.

Figure 3:
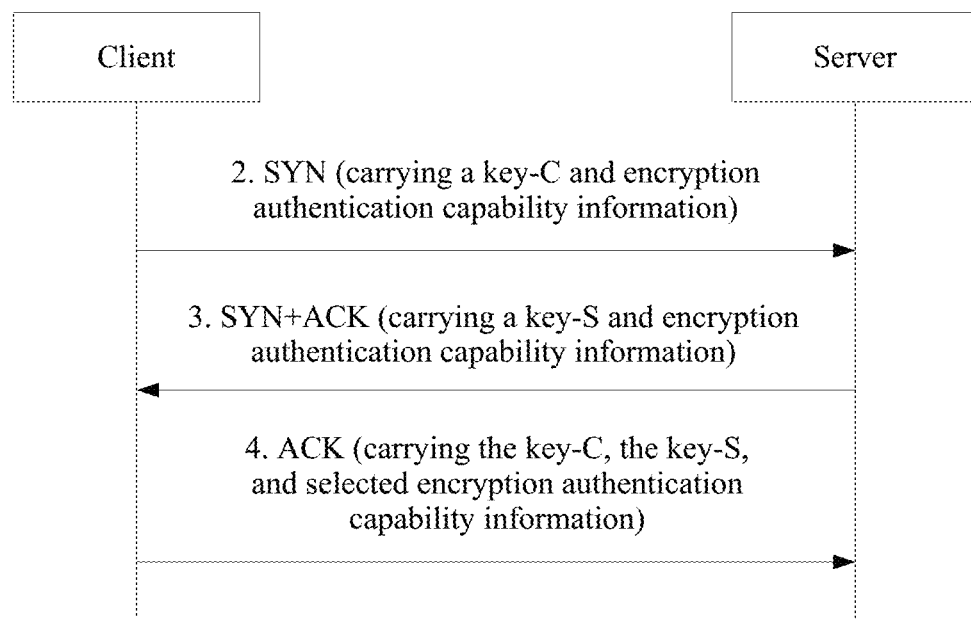
FIG. 3 is a schematic diagram of a message exchange process of establishing an MPTCP primary connection.

FIG. 3 shows a detailed description of the process of establishing the MPTCP primary connection for steps 2, 3, and 4 in FIG. 2A and FIG. 2B. A client in FIG. 3 represents the network interface A of the client in FIG. 2A and FIG. 2B, and a server represents the server in FIG. 2A and FIG. 2B.

A detailed process of establishing the MPTCP primary connection is as follows.

Message 2: The client informs the server of a key (for example, a key-C in FIG. 3) of the server and encryption and authentication capability (Flags) information.

Message 3: The server informs the client of a key (for example, a key-S in FIG. 3) of the client and encryption and authentication capability information.

Message 4: The client selects final encryption and authentication capability information based on the Flags information of the two sides, and sends the keys of the two sides again, in order to avoid a maintenance status of the server and prevent a distributed denial of service (DDoS) attack.

Figure 4:
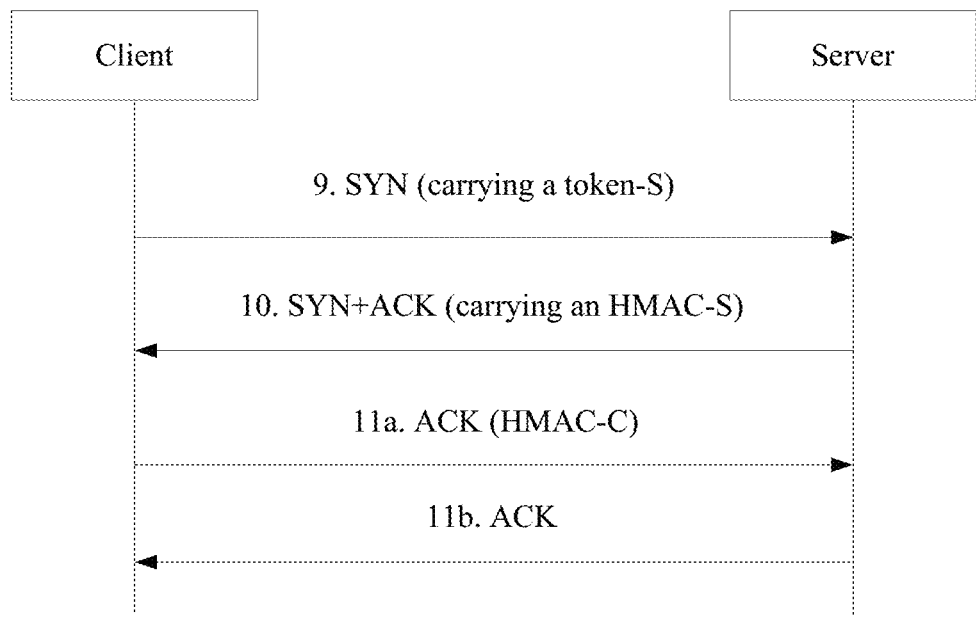
FIG. 4 is a schematic diagram of a message exchange process of establishing an MPTCP subflow.

FIG. 4 shows a detailed description of the process of establishing the MPTCP subflow for steps 9, 10, 11a, and 11b in FIG. 2A and FIG. 2B. A client represents the network interface B of the client in FIG. 2A and FIG. 2B, and a server represents the server in FIG. 2A and FIG. 2B.

A detailed process of establishing a second flow (subflow) of MPTCP is as follows.

Message 9: The client informs the server of a primary connection on which a new subflow needs to be established. In this case, the message needs to carry a token of the server (for example, a token-S in FIG. 4). In this application, a relationship between the token-S and the key-S is shown using the following formula.

Token-S={32 high-order bits are selected from a calculation result of last 20 bytes of SHA1 (key-S)}, where SHA1 is a secure hash algorithm and is an existing algorithm for calculating a token of a server when a TCP subflow is added.

Message 10: The server sends authentication information (for example, HMAC-S in FIG. 4) of the server to the client, where the authentication information is used by the client to authenticate the server, in order to verify whether the server has a key (key-C) of the client and a key (key-S) of the server. HMAC-S=HMAC (key=(key-S+key-C, Msg=(Nonce-S+Nonce-C)), where hash-based message authentication code (HMAC) is an existing authentication algorithm when a TCP subflow is added, Nonce is a random number, a purpose of using the random number is to make all generated authentication information different, Nonce-S represents a random number of the server, and Nonce-C represents a random number of the client. A meaning of the foregoing expression is as follows. After the key of the server is used as a high-order digit, the key of the client is used as a low-order digit, the random number of the server is used as a high-order digit, and the random number of the client is used as a low-order digit for inputting, the authentication information of the server is obtained by performing HMAC calculation.

Message 11a: The client sends authentication information (for example, HMAC-C in FIG. 4) of the client to the server, which is similar to the authentication in message 10, and details are not described herein again.

HMAC-C=HMAC (key=(key-C+key-S), Msg=(Nonce-C+Nonce-S))

Message 11b: The server confirms the message 11a.

Figure 5:
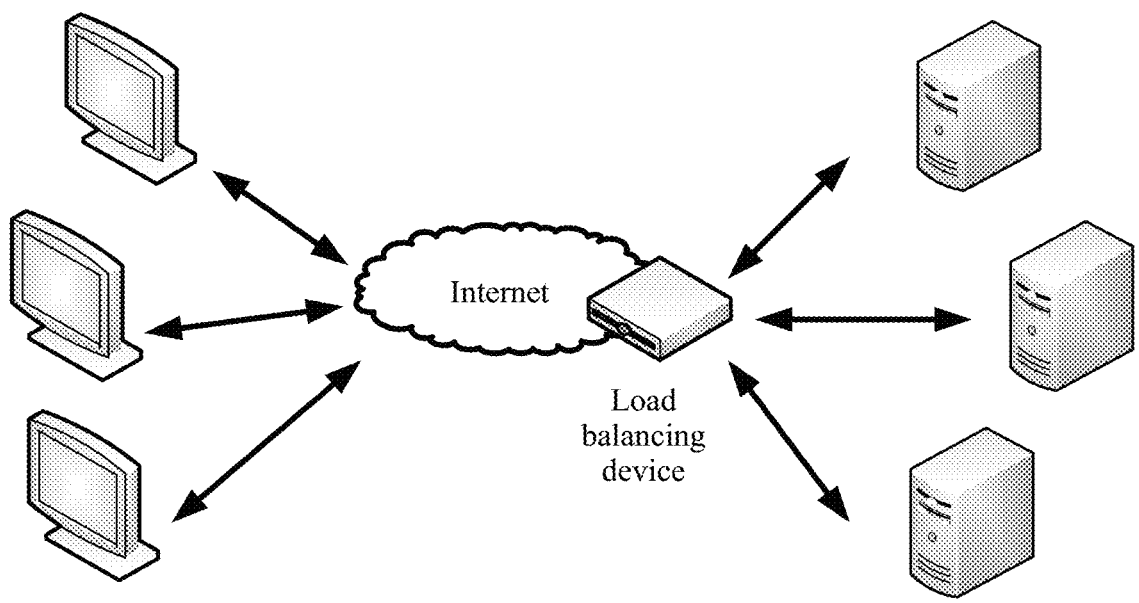
FIG. 5 is a schematic diagram of an operation of a load balancing device.

As shown in FIG. 5, as a clustering technology, load balancing (LB) distributes specific services (a network service, network traffic, and the like) to a plurality of network devices (including a server, a firewall, and the like) or a plurality of links, in order to improve service processing capabilities, thereby ensuring high service reliability.

In a networking environment such as a data center (DC), load balancing is implemented using a server, and network services are distributed to a plurality of servers for processing, in order to improve a service processing capability of the data center. A layer 4 server operates at layer 4, namely, a TCP layer. A layer 4 load balancing technology is divided into three modes: Network Address Translation (NAT), tunneling, and direct routing (DR), where the DR mode is most commonly used.

Figure 6:
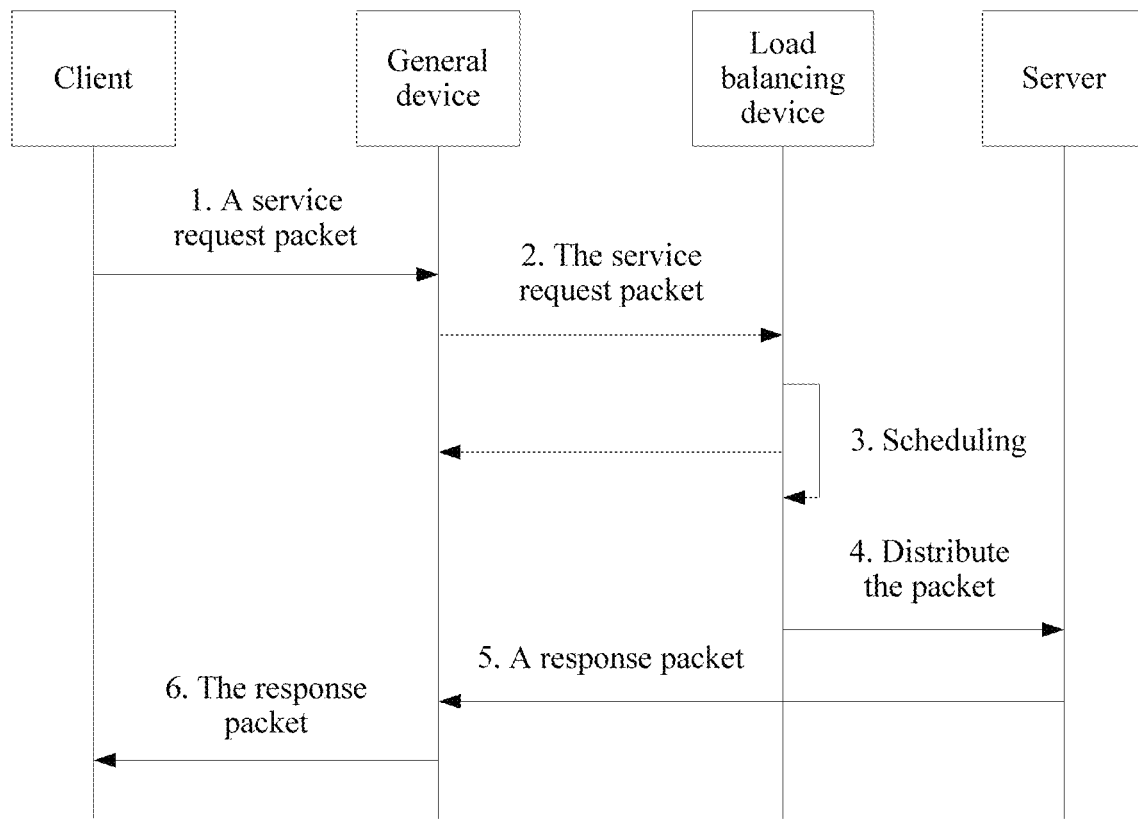
FIG. 6 is a schematic flowchart of DR in layer-4 load balancing.

FIG. 6 shows a DR procedure that is most commonly used for layer 4 load balancing. As shown in FIG. 6, devices used in a layer 4 load balancing architecture include a client, a general device that may be a router, a load balancing device (LB device), and a server.

Meanings of terms used in the DR procedure are as follows.

Virtual Service IP (VSIP): a virtual service IP address provided by a server cluster externally for a user to request a service. The VSIP needs to be configured on a loopback interface of the server in addition to the load balancing device.

Server IP: an IP address of a server, which is used when an LB product distributes service requests.

It should be noted that, when the load balancing device encapsulates a packet, a destination IP address is the VSIP, and a destination Media Access Control (MAC) address is a MAC address of the server. The destination MAC address herein is obtained by parsing the server IP using the Address Resolution Protocol (ARP), in order to ensure that a request packet can be successfully forwarded to the server.

FIG. 6 is a schematic flowchart of message exchange of DR load balancing.

(1) The client sends a service request packet using the VSIP as the destination address.

(2) After receiving the service request packet, the general device forwards the service request packet to the load balancing device. It should be noted that the VSIP on the server cannot send and respond to an ARP request. Therefore, the general device may only forward the request to the load balancing device.

(3) After receiving the service request packet, the load balancing device determines, using a scheduling algorithm, a server to which the service request packet needs to be distributed.

It should be noted that, when scheduling is performed by a current load balancing device, a judgment basis is a 5-tuple (a transmit end IP address, a transmit end port, a receive end IP address, a receive end port, and a transport layer protocol) of a flow. For example, a hash operation is performed for a 5-tuple of a flow to obtain a hash value, and then different flows are forwarded, based on the hash value, to servers corresponding to the hash values calculated for the flow.

(4) The load balancing device distributes the packets.

It should be noted that, when the load balancing device encapsulates a packet, the destination IP address is the VSIP, and the destination MAC address is the MAC address of the server (the destination MAC address is obtained by parsing the server IP using the ARP protocol), in order to ensure that the service request packet can be successfully forwarded to the server.

(5) The server receives and processes the service request packet, and returns a response packet to the general device.

It should be noted that a destination IP address of the response packet is an IP of the client.

(6) After receiving the response packet, the general device directly forwards the response packet to the client.

It should be noted that the load balancing method in FIG. 6 is no longer applicable to an MPTCP scenario, because in the MPTCP scenario, one MPTCP connection includes a plurality of TCP connections, and there is no relationship between 5-tuples of the TCP connections. If a conventional load balancing mechanism is followed, after a first TCP connection is established, a link establishment message of a second TCP connection is forwarded to a server different from that of the first TCP connection because a 5-tuple of the subsequent second TCP connection is different from a 5-tuple of the first TCP connection. In this case, the server that receives the second TCP connection cannot successfully establish the second TCP connection because related information of the first TCP connection cannot be obtained. Consequently, an MPTCP mechanism does not work, and communication efficiency is low.

In view of this, the embodiments of this application provide a load balancing system, method, and apparatus, in order to resolve a problem that the MPTCP mechanism does not work, and the communication efficiency is low because TCP connections of a same MPTCP connection cannot be identified in the existing load balancing mechanism. The method and the apparatus are based on a same inventive concept. Because a problem-resolving principle of the method is similar to that of the apparatus, mutual reference may be made between apparatus implementation and method implementation. Repeated parts are not described.

Figure 7:
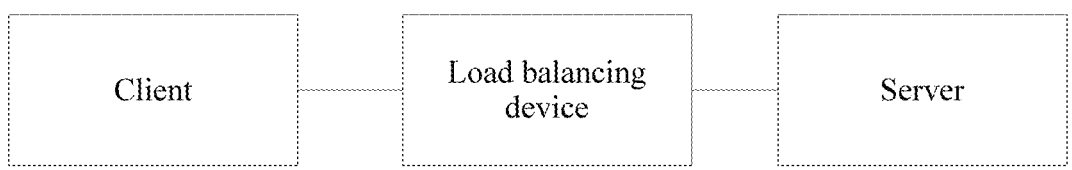
FIG. 7 is a schematic architectural diagram of a load balancing system according to an embodiment of this application.

FIG. 7 is a schematic architectural diagram of a load balancing system according to an embodiment of this application. As shown in FIG. 7, the load balancing system includes a client, a server, and a load balancing device.

The client is configured to: send, to the server using the load balancing device, a first message used to request to establish a first TCP connection; receive a response message that is of the first message and that is sent by the server; and send, to the load balancing device, a second message that is used to request to establish a second TCP connection. The response message of the first message includes a key of the server and a first function, where the first function is used to calculate a token of the server based on the key of the server. The second message includes the token that is of the server and that is calculated by the client based on the key of the server using the first function, where the second TCP connection and the first TCP connection belong to a same MPTCP session.

The server is configured to: receive the first message that is sent by the client using the load balancing device and that is used to request to establish the first TCP connection; and send the response message of the first message to the client.

The load balancing device is configured to: receive the first message that is sent by the client and that is used to request to establish the first TCP connection; send the first message to the server; receive the second message that is sent by the client and that is used to request to establish the second TCP connection; determine, based on the token of the server included in the second message, that a destination device of the second message is the server; and send the second message to the server, in order to establish the second TCP connection between the client and the server.

Figure 8:
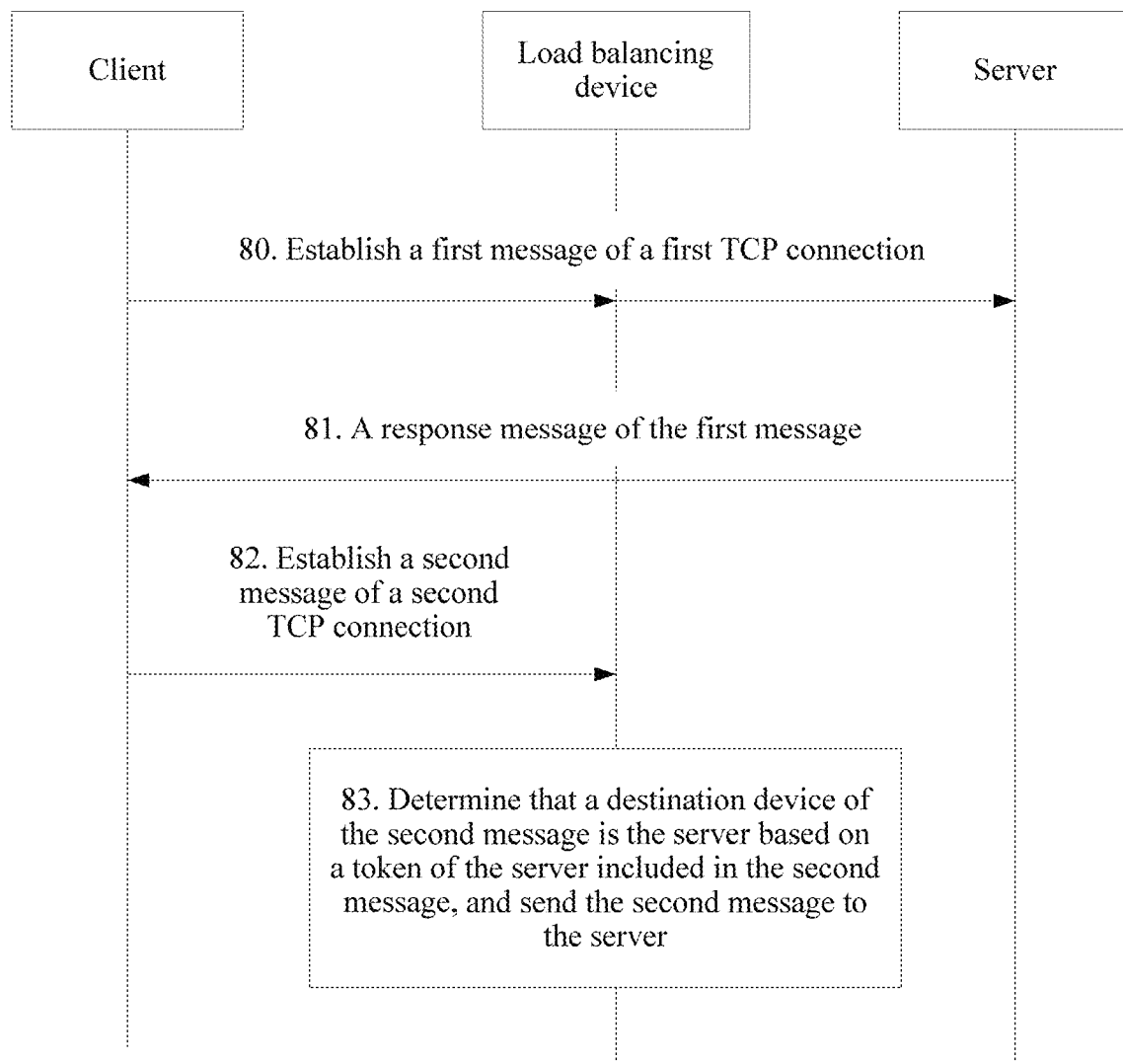
FIG. 8 is a schematic flowchart of a load balancing method according to an embodiment of this application.

Based on the system architecture shown in FIG. 7, FIG. 8 is a schematic flowchart of a load balancing method according to an embodiment of this application. The procedure may be specifically implemented by hardware, software programming, or a combination of software and hardware.

As shown in FIG. 8, the procedure includes the following steps.

Step 80: A server receives a first message that is sent by a client using a load balancing device and that is used to request to establish a first TCP connection.

It should be noted that the first TCP connection in this application is an MPTCP primary connection, the second TCP connection is an MPTCP subflow, the first message may be a SYN for establishing the MPTCP primary connection, and the first message carries a key of the client.

Further, after performing step 80 and before performing step 81, the server further needs to perform the following process.

The server calculates the token of the server based on a number of the server using a second function, and calculates the key of the server based on the token of the server using the first function, where the second function is a function negotiated between the server and the load balancing device.

For example, that the server calculates the token of the server based on the number of the server using the second function may be implemented using the following process.

The server calculates the token of the server based on the number of the server and a first key using the second function, where the first key is a key negotiated between the server and the load balancing device.

Step 81: The server sends a response message of the first message to the client.

The response message of the first message includes the key of the server and the first function, and the first function is used to calculate the token of the server based on the key of the server.

Optionally, after step 81 is performed, the server receives an acknowledgement message that is sent by the client and that is used for establishing the first TCP connection. The acknowledgement message carries the key of the client, the key of the server, and encryption and authentication capability messages of the two parties.

Step 82: The client sends, to the load balancing device, a second message used to request to establish a second TCP connection.

The second message includes the token that is of the server and that is calculated by the client based on the key of the server using the first function. The token is used to indicate that the second TCP connection and the first TCP connection established in the first part belong to a same MPTCP session. Optionally, the second message may be a SYN for establishing the MPTCP subflow.

Step 83: The load balancing device determines, based on a token of the server included in the second message, that a destination device of the second message is the server, and sends the second message to the server, in order to establish the second TCP connection between the client and the server.

The following process may be implemented such that the load balancing device determines, based on the token of the server included in the second message, that the destination device of the second message is the server.

The load balancing device calculates the number of the server based on the token of the server using the second function, and determines that the destination device of the second message is the server corresponding to the number, where the second function is a function negotiated between the server and the load balancing device.

It should be noted that, after the load balancing device obtains the number of the server through calculation, optionally, the number of the server includes an identifier of the server and an identifier of the MPTCP session, and the load balancing device forwards an establishment message of the second TCP connection to the server based on the identifier of the server included in the number of the server.

It can be learned from the foregoing procedure that a new load balancing mechanism is used in this application. For the MPTCP primary connection, a conventional load balancing manner, such as a 5-tuple hash, is maintained. For the MPTCP subflow, a token field of the server included in the second message that is used to establish the second TCP connection is identified, and a number of a server in which the MPTCP primary connection is located is calculated, such that the MPTCP subflow is forwarded to a same server as the MPTCP primary connection based on the number of the server obtained through calculation.

Figure 9A:
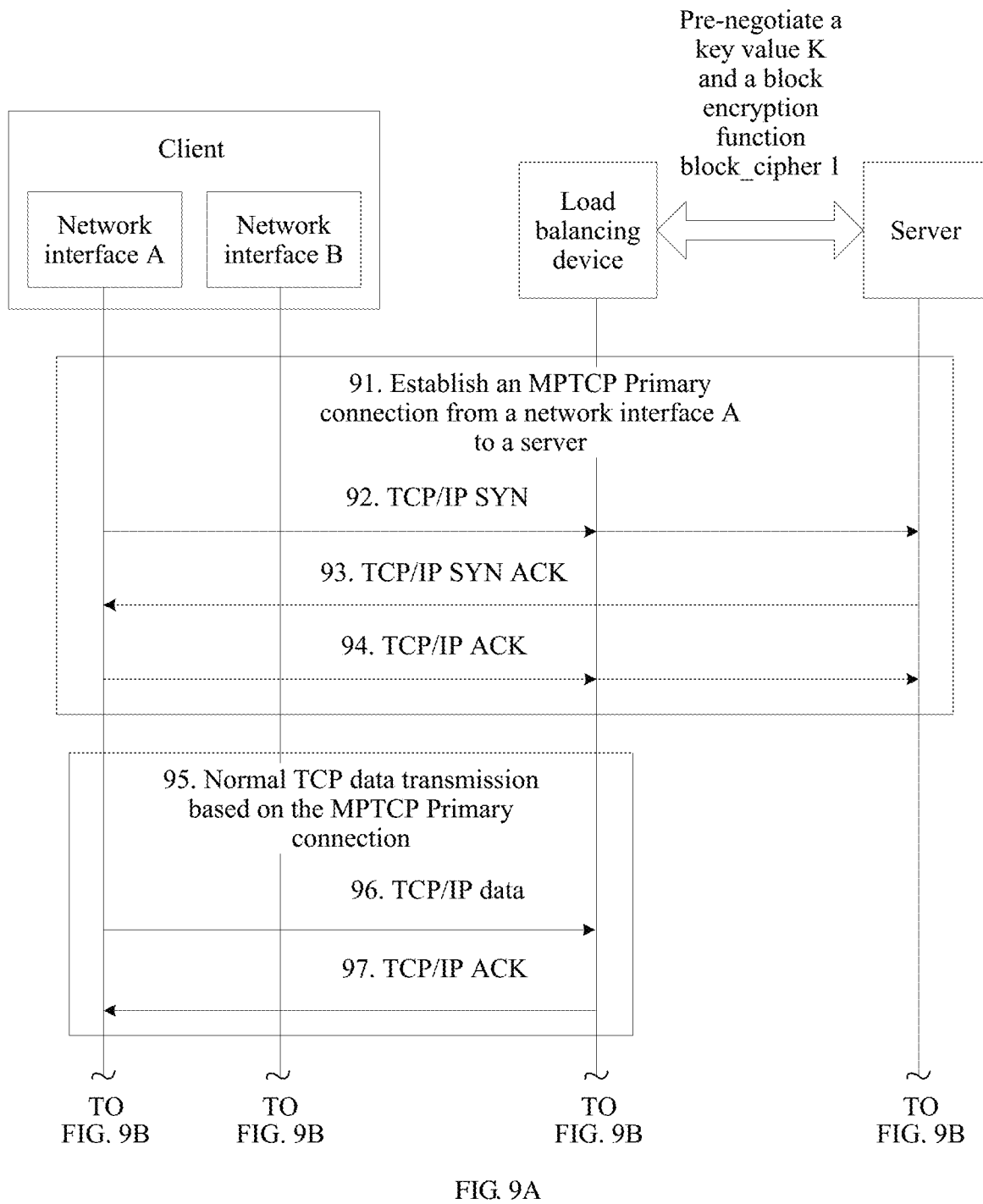
FIG. 9A and FIG. 9B are schematic flowcharts of exchanging messages for establishing an MPTCP connection using a load balancing method.
Figure 9B:
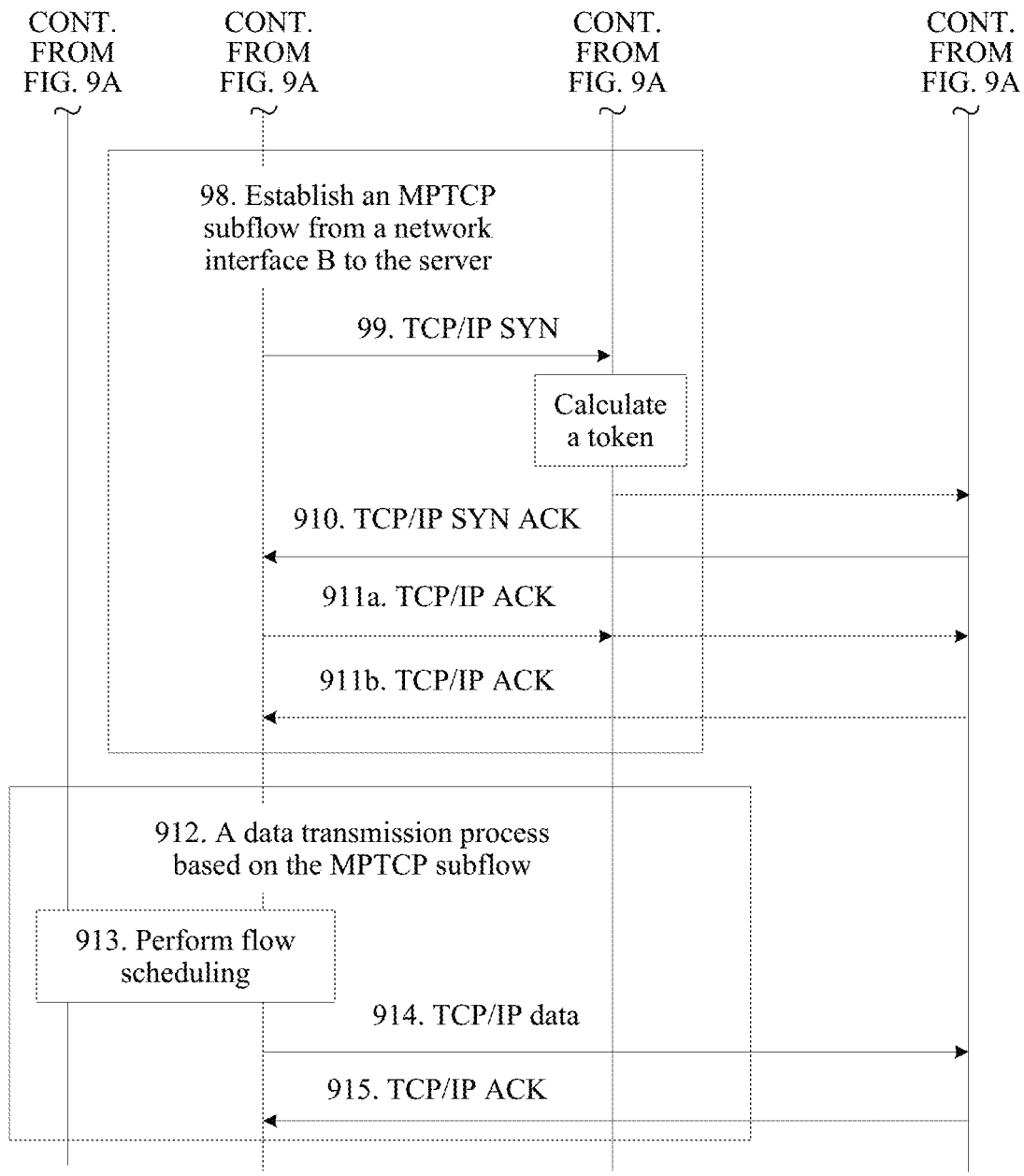

FIG. 9A and FIG. 9B are schematic flowcharts of exchanging messages for establishing an MPTCP connection using the load balancing method shown in FIG. 8. As shown in FIG. 9A and FIG. 9B, three devices are mainly used in the procedure: a client, a server, and a load balancing device. The client includes two network interfaces: a network interface A and a network interface B. Optionally, the network interface A may be a Wi-Fi network interface, and the network interface B may be an LTE network interface. This is merely used as an example for description, and no specific limitation is imposed herein. It should be noted that, herein, that the client includes two network interfaces is merely used as an example for description, and a quantity of network interfaces is not specifically limited. Optionally, the quantity of network interfaces may be one or more. In this application, that the client includes two network interfaces is used as an example for description. If only one network interface is included, a plurality of TCP connections may be established using the only one network port. If three network interfaces are included, a process of establishing a third TCP connection is similar to that of establishing a second network interface, and details are not described in this application again.

Similar to the message procedure in FIG. 2A and FIG. 2B, each message behavior in an MPTCP primary connection and an MPTCP subflow is explained in detail herein. In addition, compared with FIG. 2A and FIG. 2B, the load balancing device between the client and the server is added to the network architecture for performing load balancing. Message exchange steps are as follows.

Pre-negotiation step: As shown in FIG. 9A and FIG. 9B, a double sided arrow between the load balancing device and the server indicates that it is necessary to pre-negotiate an encryption function and sharing of a first key between the load balancing device and the server in this application. A block encryption function herein is the foregoing second function in this application. Optionally, the first key herein is a 32-bit key value K. Optionally, the negotiated encryption function may be the block encryption function, denoted by block_cipher 1. Optionally, an RC5_32 bit encryption algorithm is used in this application. It should be noted that a specific method for generating and sharing the key value K and a method for negotiating the block encryption function block_cipher 1 are not specified in this application. Pre-configuration may be performed, or another existing method or protocol may be used. In addition, the RC5 32 bit encryption algorithm is only verified from a feasibility perspective, and there may be a plurality of functions that meet this condition. An example is merely used in this application for description, and no specific limitation is imposed.

91. Establish an MPTCP primary connection from the network interface A (such as the Wi-Fi network interface) of the client to the server. This is a range of messages, including messages 92, 93, and 94, and a message format is not different from that of the corresponding message in FIG. 2A and FIG. 2B.

92. TCP/IP SYN. There is no difference between the message 92 and the message 2 in FIG. 2A and FIG. 2B. After receiving the message 92, the load balancing device allocates a TCP flow to a server in a conventional load balancing mode.

After receiving the message 92, the server needs to calculate a token (token-S) and a key (key-S) of the server according to steps specified in this application. Generation steps are as follows.

(1) Number each server (32 bits): N. (Note that N herein will be an integer; and some bits of the integer (for example, 10 bits) indicate a server identifier (ID), and remaining bits (for example, 22 bits) are an ID of each MPTCP session.)

(2) Generate the token-S, token-S=block_cipher 1 (N, K), where K and block_cipher 1 are defined in the foregoing pre-negotiation step, and K herein is the foregoing first key of this application. According to this method, the token-S is calculated. The numbers N of the servers are different, and the token-S is generated using different numbers and RC5_32 encryption. Therefore, it can be ensured that the following problem can be avoided: a conflict occurs because different servers generate a same token.

(3) The server generates a key.

For example, the server generates a 32-bit random number L that is used as 32 low-order bits of the key-S.

On the server side, according to a formula: token-S=block_cipher 2 (H, L), 32 high-order bits of the key-S are calculated and denoted by H. Optionally, block_cipher 2 is also an RC5_32 block encryption function, and is the foregoing first function of this application.

Here, it is specified that the key-S of the server is (H, L) (64 bits). In the message 93 in FIG. 9A and FIG. 9B, the key-S is sent to the client, and a bit in a Flags field of the server is used to represent a used block_cipher 2 function type.

93. TCP/IP SYN ACK. A message format of the message 93 is the same as the message format of the message 3 in FIG. 2A and FIG. 2B. A difference lies in that a key in the message 93 in FIG. 9A and FIG. 9B is the key calculated by the server in the previous step. There is no provision in an original RFC 6824 standard, or a 64-bit random number is used in a Linux kernel.

94. TCP/IP ACK. There is no difference between the message 94 and the message 4 in FIG. 2A and FIG. 2B.

95. A normal TCP data transmission process based on the MPTCP primary connection. This part is a range of messages, including messages 96 and 97, and is not different from the messages 6 and 7 in FIG. 2A and FIG. 2B.

96. TCP/IP data. There is no difference between the message 96 and the message 6 in FIG. 2A and FIG. 2B.

97. TCP/IP ACK. There is no difference between the message 97 and the message 7 in FIG. 2A and FIG. 2B.

98. Establish an MPTCP subflow from the network interface B (such as the LTE network interface) of the client to the server in a four-way handshake manner. This is a range of messages, including messages 99, 910, 911a, and 911b. There is no difference between a message format and the message format of the message 8 in FIG. 2A and FIG. 2B.

However, before this step starts, the client needs to calculate the token of the server, namely, the token-S, based on the received key of the server in the message 93 in FIG. 9A and FIG. 9B and an encryption function specified in the Flags field and according to the formula token-S=block_cipher 2 (H, L), and carries the token-S in a SYN packet (the message 99 in FIG. 9A and FIG. 9B) for establishing the MPTCP subflow.

99. TCP/IP SYN. A format of the message 99 is the same as the format of the message 9 in FIG. 2A and FIG. 2B. A difference lies in that the token-S calculated in step 98 needs to be used as the token of the server carried in the message 99 in FIG. 9A and FIG. 9B.

In addition, after receiving the message 99, the load balancing device parses out the token of the server. Then, the load balancing device calculates the number N of the server based on K (pre-negotiated), block_cipher 1, and according to the formula token-S=block_cipher 1 (N, K). In this way, the load balancing device determines a correct address of the server to which the message is forwarded, in other words, the message is correctly forwarded to a server in which the MPTCP primary connection is located. Therefore, uniform load balancing is implemented among different TCP subflows of an MPTCP primary connection, to be more specific, both a primary connection and a subflow are forwarded to a same server.

It should be noted that, after calculating the number N of the server, the load balancing device may obtain a server identifier in N, in order to determine a server corresponding to the server identifier. Correspondingly, after receiving the message 99 sent by the load balancing device, the server may calculate N based on the token included in the message 99, and determine, based on the identifier of the MPTCP session obtained from N, an MPTCP session to which a TCP connection that is established at the request of the message 99 belongs.

The server uses a special manner of generating a token and a key. Therefore, it is ensured that the load balancing device can implement uniform load balancing among different TCP subflows of an MPTCP primary connection. In other words, all TCP subflows of a same MPTCP session can be forwarded to a same server.

910. TCP/IP SYN ACK. There is no difference between the message 910 and the message 10 in FIG. 2A and FIG. 2B.

911a. TCP/IP ACK. There is no difference between the message 911a and the message 11a in FIG. 2A and FIG. 2B.

911b. TCP/IP ACK. There is no difference between the message 911b and the message 11b in FIG. 2A and FIG. 2B.

912. A data transmission process based on the MPTCP subflow. This is a range of messages, including steps 913, 914, and 915, which are not different from steps 13, 14, and 15 in FIG. 2A and FIG. 2B.

913. Perform scheduling before data is sent on an MPTCP layer, and then determine which TCP flow in the primary connection and the subflow is used as a data sending link. There is no difference between this step and step 13 in FIG. 2A and FIG. 2B.

914. TCP/IP data. There is no difference between the message 914 and the message 14 in FIG. 2A and FIG. 2B.

915. TCP/IP ACK. There is no difference between the message 915 and the message 15 in FIG. 2A and FIG. 2B.

Application of the load balancing methods in FIG. 8, FIG. 9A, and FIG. 9B is described below using two application scenarios.

Figure 10:
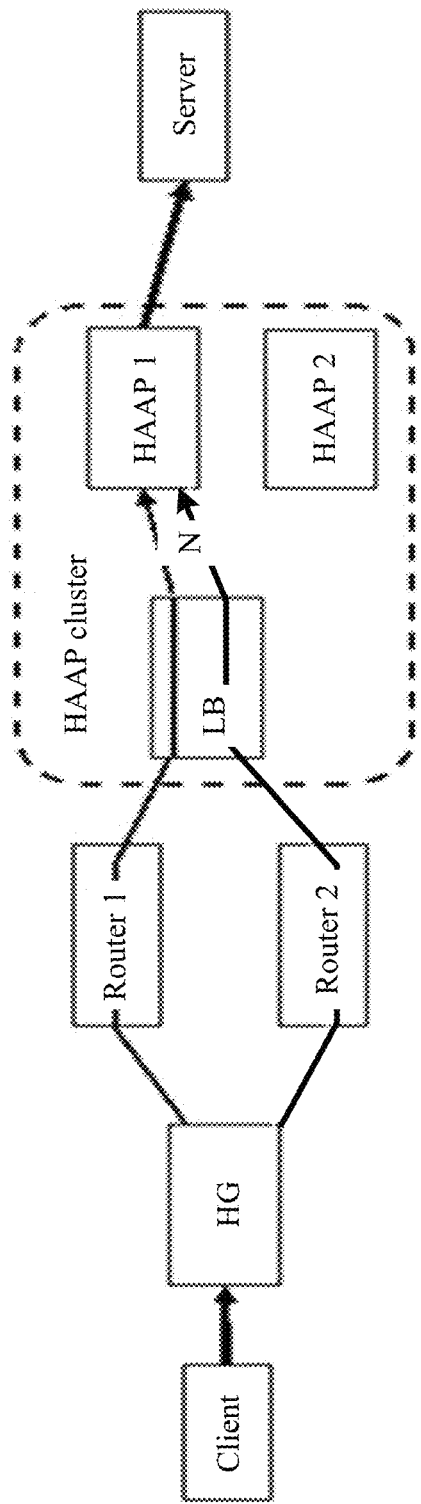
FIG. 10 and FIG. 11 are schematic diagrams of application scenarios of a load balancing method according to this application.

FIG. 10 is a schematic diagram of application of a load balancing method in a bonding access (BA) scenario. Devices in the application scenario include the following:

Client: for example, a computer or personal computer (PC) of a family user, may be used to access applications on some external servers, such as video viewing, and the PC supports an MPTCP protocol.

Home gateway (HG): a network access device installed at a user's home by an operator. This type of access device may have a plurality of interfaces at a wide area network (WAN) end, such as an asymmetric digital subscriber line (ADSL), Wi-Fi, and LTE. The plurality of interfaces may be used as different egresses for MPTCP multipath transmission to implement bonding access.

Router 1/router 2: a routing device on a transmission link.

Load balancing device: configured to perform load balancing on a Hybrid Access Aggregation Point (HAAP) device.

A HAAP cluster includes a plurality of HAAP devices and is responsible for terminating hybrid access requests from different HG devices. FIG. 10 shows two HAAP devices: HAAP 1 and HAAP 2.

Server: a server that runs an application.

In the BA scenario: the load balancing device determines a number N of a HAAP device for a TCP flow 1, and the HAAP device corresponding to the number N sends a corresponding token to the HG. In FIG. 10, an example in which N is 1 is used for description.

When establishing a TCP flow 2, the HG carries a token sent by the HAAP 1 and sends the token to the load balancing device. Then, the load balancing device calculates the number N of the HAAP based on the token. The load balancing device transfers the TCP flows 2 to a same HAAP device based on the number N.

In this way, the load balancing device may implement uniform load balancing among different TCP subflows of an MPTCP primary connection. In other words, all TCP subflows of a same MPTCP session can be forwarded to a same HAAP device.

Figure 11:
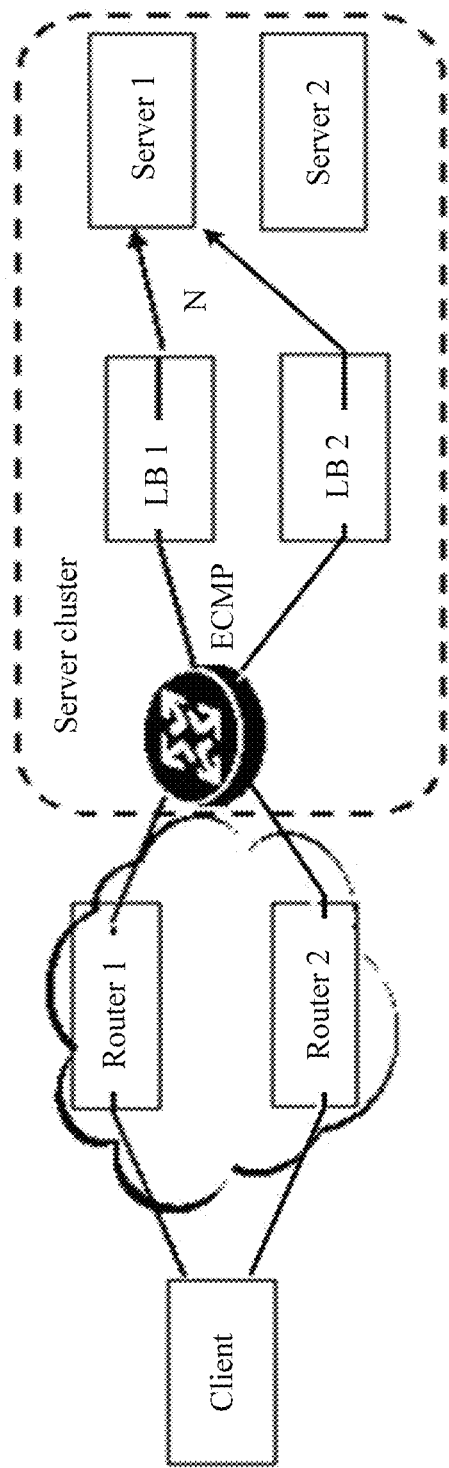

FIG. 11 is a schematic diagram of application of a load balancing method in a data center scenario. Devices in the application scenario include the following.

Client: for example, a computer (PC) of a family user, may be used to access applications on some external servers, such as video viewing, and the PC supports an MPTCP protocol.

Router 1/router 2: a routing device on a transmission link.

Equal-cost multipath routing (ECMP) load balancing device: implements equal-cost multipath load balancing by calculating a hash value for a 5-tuple of a flow.

Load balancing device: an LB 1/an LB 2 herein, configured to perform load balancing on a server.

Server: a server 1/a server 2 herein. The server supports the MPTCP protocol.

In the DC scenario: The LB 1 determines a number N of the server for a TCP flow 1, and the server corresponding to the number N sends a corresponding token to the client. In FIG. 11, an example in which N is 1 is used for description.

When establishing a TCP flow 2, the client carries a token sent by the server. Then, the LB 2 calculates the number N of the server. The LB 2 transfers, based on the number N of the server, the TCP flows 2 to a same server whose number is N.

In this way, the LB 1/the LB 2 may implement uniform load balancing among different TCP flows of an MPTCP primary connection. In other words, all TCP subflows of a same MPTCP session can be forwarded to a same server.

Figure 12:
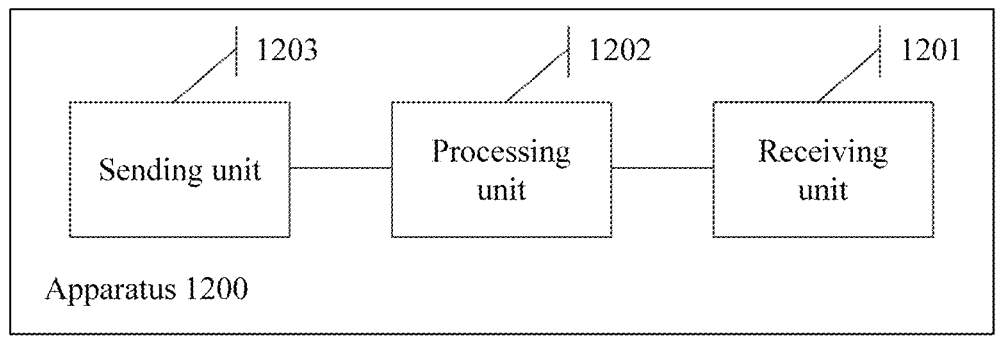
FIG. 12 is a schematic structural diagram of a load balancing apparatus according to an embodiment of this application.

Based on the load balancing method provided in the foregoing embodiment, referring to FIG. 12, an embodiment of this application provides a load balancing apparatus 1200. The apparatus 1200 is applied to a server. FIG. 12 is a schematic structural diagram of the apparatus 1200 according to this embodiment of this application. As shown in FIG. 12, the apparatus 1200 includes a receiving unit 1201, a processing unit 1202, and a sending unit 1203.

The receiving unit 1201 is configured to receive a first message that is sent by a client using a load balancing device and that is used to request to establish a first TCP connection.

The processing unit 1202 is configured to generate a response message of the first message based on the first message.

The sending unit 1203 is configured to send the response message of the first message to the client, where the response message of the first message includes a key of the server and a first function, and the first function is used by the client to calculate a token of the server based on the key of the server, in order to establish, based on the token of the server, a second TCP connection that is to the server and that belongs to a same MPTCP session as the first TCP connection.

Optionally, the processing unit 1202 is further configured to: calculate the token of the server based on a number of the server using a second function; and calculate the key of the server based on the token of the server using the first function, where the second function is a function negotiated between the server and the load balancing device.

Optionally, when calculating the token of the server based on the number of the server using the second function, the processing unit 1202 is configured to calculate the token of the server based on the number of the server and a first key using the second function, where the first key is a key negotiated between the server and the load balancing device.

It should be understood that division of the units in the foregoing apparatus 1200 is merely logical function division. During actual implementation, all or some of the units may be integrated into one physical entity, or the units may be physically separated. For example, the foregoing units may be separately disposed processing elements, or may be integrated into a chip of the server for implementation, or may be stored in a memory element of the server in a form of program code and invoked by a processing element of the server to implement functions of the foregoing units. In addition, the units may be integrated or may be implemented separately. The processing element herein may be an integrated circuit (IC) chip and has a signal processing capability. In an implementation process, steps in the foregoing methods or the foregoing units can be implemented using a hardware integrated logical circuit in the processing element, or using instructions in a form of software. The processing element may be a general-purpose processor, for example, a central processing unit (CPU), or may be configured as one or more integrated circuits that perform the foregoing methods, for example, one or more application-specific integrated circuits (ASICs), one or more microprocessors or digital signal processors (DSPs), or one or more field programmable gate arrays (FPGA), or the like.

It should be noted that, for function implementation and an interaction manner of each unit of the apparatus 1200 in this embodiment of this application, further reference may be made to descriptions in a related method embodiment. Details are not described herein again.

Figure 13:
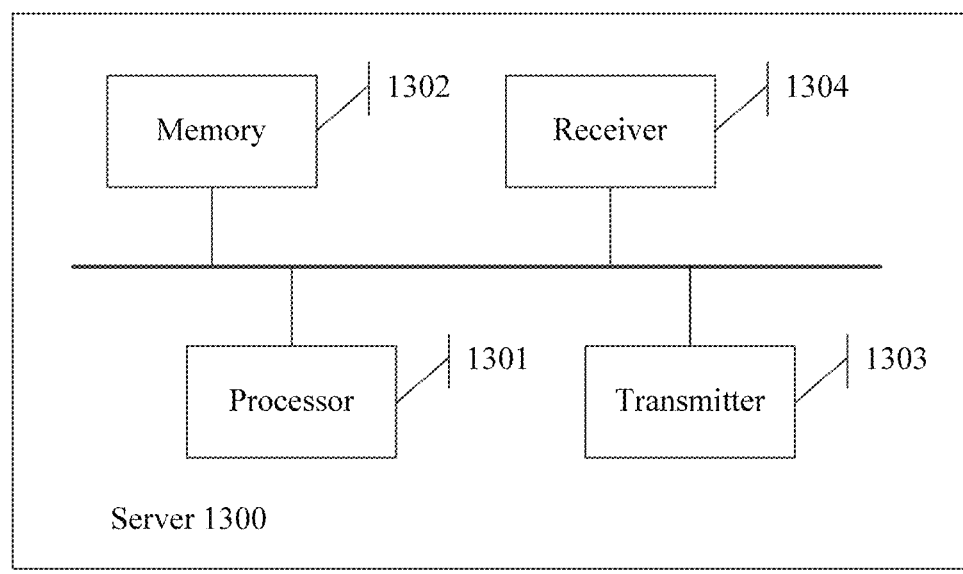
FIG. 13 is a schematic structural diagram of a client according to an embodiment of this application.

An embodiment of this application further provides a server 1300. FIG. 13 is a schematic structural diagram of the server 1300 according to an embodiment of this application. As shown in FIG. 13, the server 1300 includes a processor 1301, a memory 1302, a transmitter 1303, and a receiver 1304. Program code for performing the solutions of the present disclosure is stored in the memory 1302, and is controlled and executed by the processor 1301.

Program stored in the memory 1302 is used to instruct the processor 1301 to perform a load balancing method, including: receiving a first message that is sent by a client using a load balancing device and that is used to request to establish a first TCP connection; generating a response message of the first message based on the first message; and sending the response message of the first message to the client, where the response message of the first message includes a key of the server 1300 and a first function, and the first function is used by the client to calculate a token of the server 1300 based on the key of the server 1300, in order to establish, based on the token of the server 1300, a second TCP connection that is to the server and that belongs to a same MPTCP session as the first TCP connection.

Optionally, the processor 1301 is further configured to: calculate the token of the server 1300 based on a number of the server 1300 using a second function; and calculate the key of the server 1300 based on the token of the server 1300 using the first function, where the second function is a function negotiated between the server 1300 and the load balancing device.

Optionally, when calculating the token of the server 1300 based on the number of the server 1300 using the second function, the processor 1301 is configured to calculate the token of the server 1300 based on the number of the server 1300 and a first key using the second function, where the first key is a key negotiated between the server 1300 and the load balancing device.

It can be understood that the server 1300 in this embodiment may be configured to implement all functions of the server in the foregoing method embodiment. For a detailed implementation process, refer to the related description of the method performed by the server in the foregoing method embodiment. Details are not described herein again.

It can be understood that the processor 1301 in the server 1300 in this embodiment of this application may be a general-purpose central processing unit (CPU), a microprocessor, an application-specific integrated circuit (ASIC), or one or more integrated circuits configured to control program execution in the solutions of the present disclosure. One or more memories included in a computer system may be a read-only memory read-only memory (ROM) or another type of static storage device that is capable of storing static information and a static instruction, a random access memory random access memory (RAM) or another type of dynamic storage device that is capable of storing information and an instruction, or may be a magnetic disk memory. The memories are connected to the processor using a bus.

Functions of the receiver 1304 and the transmitter 1303 may be implemented using a transceiver, and the transceiver may be an entity module that is capable of implementing a transceiver function, in order to communicate with another device or another communications network.

The memory 1302, such as a RAM, stores an operating system and a program that is used to execute the solutions in the present disclosure. The operating system is a program that is used to control operating of another program and manage system resources.

The memory 1302, the transmitter 1303, and the receiver 1304 may be connected to the processor 1301 using a bus, or may be separately connected to the processor 1301 using a dedicated connection cable.

Code corresponding to the foregoing method is written permanently into a chip by designing programming for the processor 1301, such that when operating, the chip can perform an execution process of the server in the methods shown FIG. 8 to FIG. 11.

Figure 14:
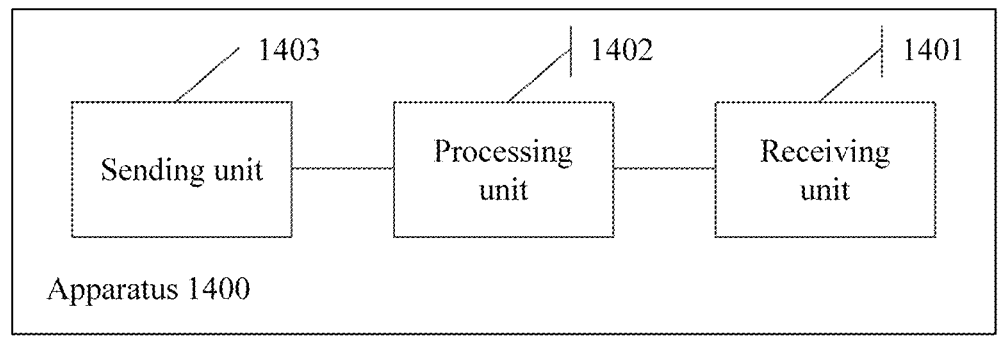
FIG. 14 is a schematic structural diagram of a load balancing apparatus according to an embodiment of this application.

Based on the load balancing method provided in the foregoing embodiment, referring to FIG. 14, an embodiment of this application provides a load balancing apparatus 1400. The apparatus 1400 is applied to a client. FIG. 14 is a schematic structural diagram of the apparatus 1400 according to this embodiment of this application. As shown in FIG. 14, the apparatus 1400 includes a receiving unit 1401, a processing unit 1402, and a sending unit 1403.

The sending unit 1403 is configured to send, to a server using a load balancing device, a first message used to request to establish a first TCP connection.

The receiving unit 1401 is configured to receive a response message that is of the first message and that is sent by the server, where the response message of the first message includes a key of the server and a first function, and the first function is used to calculate a token of the server based on the key of the server.

The processing unit 1402 is configured to: calculate the token of the server based on the key of the server using the first function; and send, to the load balancing device, a second message used to request to establish a second TCP connection, where the second message includes the token of the server, the token of the server is used by the load balancing device to determine that a destination device of the second message is the server, in order to establish the second TCP connection between the client and the server, and the second TCP connection and the first TCP connection belong to a same MPTCP session.

It should be understood that division of the units in the foregoing apparatus 1400 is merely logical function division. During actual implementation, all or some of the units may be integrated into one physical entity, or the units may be physically separated. For example, the foregoing units may be separately disposed processing elements, or may be integrated into a chip of the client for implementation, or may be stored in a memory element of the server in a form of program code and invoked by a processing element of the client to implement functions of the foregoing units. In addition, the units may be integrated or may be implemented separately. The processing element herein may be an integrated circuit chip and has a signal processing capability. In an implementation process, steps in the foregoing methods or the foregoing units can be implemented using a hardware integrated logical circuit in the processing element, or using instructions in a form of software. The processing element may be a general-purpose processor, for example, a central processing unit (CPU), or may be configured as one or more integrated circuits that perform the foregoing methods, for example, one or more application-specific integrated circuits (ASIC), one or more microprocessors (DSP), or one or more field programmable gate arrays (FPGA), or the like.

It should be noted that, for function implementation and an interaction manner of each unit of the apparatus 1400 in this embodiment of this application, further reference may be made to descriptions in a related method embodiment. Details are not described herein again.

Figure 15:
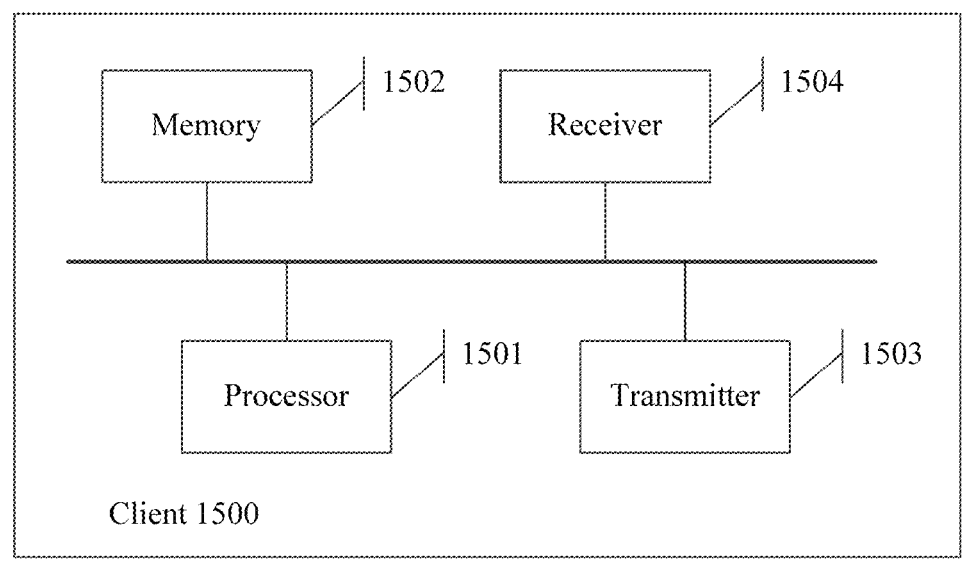
FIG. 15 is a schematic structural diagram of a server according to an embodiment of this application.

An embodiment of this application further provides a client 1500. FIG. 15 is a schematic structural diagram of the client 1500 according to an embodiment of this application. As shown in FIG. 15, the client 1500 includes a processor 1501, a memory 1502, a transmitter 1503, and a receiver 1504. Program code for performing the solutions of the present disclosure is stored in the memory 1502, and is controlled and executed by the processor 1501.

Program stored in the memory 1502 is used to instruct the processor 1501 to perform a load balancing method, including: sending, to a server using a load balancing device, a first message used to request to establish a first TCP connection; receiving a response message that is of the first message and that is sent by the server, where the response message of the first message includes a key of the server and a first function, and the first function is used to calculate a token of the server based on the key of the server; and calculating the token of the server based on the key of the server using the first function, and sending, to the load balancing device, a second message used to request to establish a second TCP connection, where the second message includes the token of the server, the token of the server is used by the load balancing device to determine that a destination device of the second message is the server, in order to establish the second TCP connection between the client 1500 and the server, and the second TCP connection and the first TCP connection belong to a same MPTCP session.

It can be understood that the client 1500 in this embodiment may be configured to implement all functions of the client in the foregoing method embodiment. For a detailed implementation process, refer to the related description of the method performed by the client in the foregoing method embodiment. Details are not described herein again.

It can be understood that the processor 1501 in the client 1500 in this embodiment of this application may be a general-purpose central processing unit (CPU), a microprocessor, an application-specific integrated circuit application-specific integrated circuit (ASIC), or one or more integrated circuits configured to control program execution in the solutions of the present disclosure. One or more memories included in a computer system may be a read-only memory read-only memory (ROM) or another type of static storage device that is capable of storing static information and a static instruction, a random access memory random access memory (RAM) or another type of dynamic storage device that is capable of storing information and an instruction, or may be a magnetic disk memory. The memories are connected to the processor using a bus.

Functions of the receiver 1504 and the transmitter 1503 may be implemented using a transceiver, and the transceiver may be an entity module that is capable of implementing a transceiver function, in order to communicate with another device or another communications network.

The memory 1502, such as a RAM, stores an operating system and a program that is used to execute the solutions in the present disclosure. The operating system is a program that is used to control operating of another program and manage system resources.

The memory 1502, the transmitter 1503, and the receiver 1504 may be connected to the processor 1501 using a bus, or may be separately connected to the processor 1501 using a dedicated connection cable.

Code corresponding to the foregoing method is written permanently into a chip by designing programming for the processor 1501, such that when operating, the chip can perform an execution process of the client in the methods shown in FIG. 8 to FIG. 11.

Figure 16:
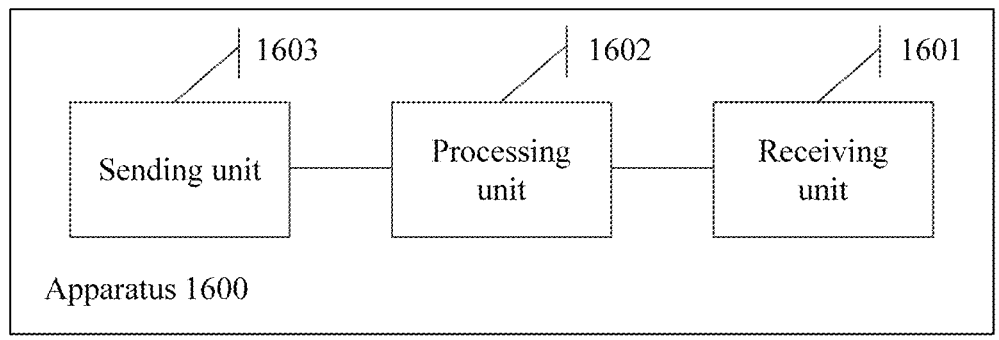
FIG. 16 is a schematic structural diagram of a load balancing apparatus according to an embodiment of this application.

Based on the load balancing method provided in the foregoing embodiment, referring to FIG. 16, an embodiment of this application provides a load balancing apparatus 1600. FIG. 16 is a schematic structural diagram of the apparatus 1600 according to this embodiment of this application. As shown in FIG. 16, the apparatus 1600 includes a receiving unit 1601, a processing unit 1602, and a sending unit 1603.

The receiving unit 1601 is configured to receive a first message that is sent by a client and that is used to request to establish a first TCP connection.

The sending unit 1603 is configured to send the first message to a server.

The receiving unit 1601 is further configured to receive a second message that is sent by the client and that is used to request to establish a second TCP connection, where the second TCP connection and the first TCP connection belong to a same MPTCP session, and the second message includes a token of the server.

The processing unit 1602 is configured to: determine, based on the token of the server included in the second message, that a destination device of the second message is the server; and send the second message to the server, in order to establish the second TCP connection between the client and the server.

Optionally, when determining, based on the token of the server included in the second message, that the destination device of the second message is the server, the processing unit 1602 is configured to: calculate a number of the server based on the token of the server; and determine that the destination device of the second message is the server corresponding to the number.

Optionally, when calculating the number of the server based on the token of the server, the processing unit 1602 is configured to calculate the number of the server based on the token of the server using a function negotiated between the load balancing device and the server.

It should be understood that division of the units in the foregoing apparatus 1600 is merely logical function division. During actual implementation, all or some of the units may be integrated into one physical entity, or the units may be physically separated. For example, the foregoing units may be separately disposed processing elements, or may be integrated into a chip of a load balancer for implementation, or may be stored in a memory element of a load balancer in a form of program code and invoked by a processing element of the load balancer to implement functions of the foregoing units. In addition, the units may be integrated or may be implemented separately. The processing element herein may be an integrated circuit chip and has a signal processing capability. In an implementation process, steps in the foregoing methods or the foregoing units can be implemented using a hardware integrated logical circuit in the processing element, or using instructions in a form of software. The processing element may be a general-purpose processor, for example, a central processing unit (CPU), or may be configured as one or more integrated circuits that perform the foregoing methods, for example, one or more application-specific integrated circuits (ASICs), one or more microprocessors (DSP), or one or more field programmable gate arrays (FPGA), or the like.

It should be noted that, for function implementation and an interaction manner of each unit of the apparatus 1600 in this embodiment of this application, further reference may be made to descriptions in a related method embodiment. Details are not described herein again.

Figure 17:
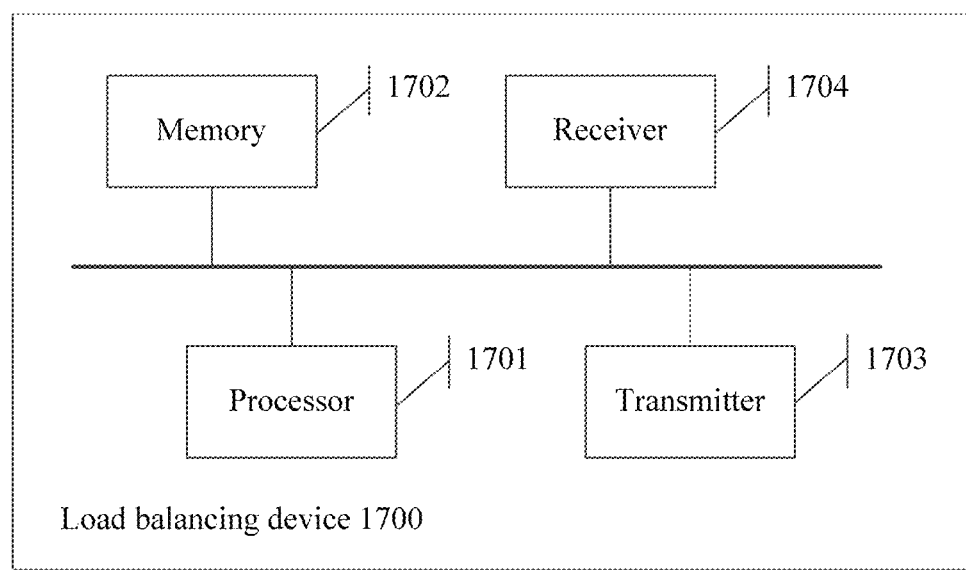
FIG. 17 is a schematic structural diagram of a load balancing device according to an embodiment of this application.

An embodiment of this application further provides a load balancing device 1700. FIG. 17 is a schematic structural diagram of the load balancing device 1700 according to an embodiment of this application. As shown in FIG. 17, the load balancing device 1700 includes a processor 1701, a memory 1702, a transmitter 1703, and a receiver 1704. Program code for performing the solutions of the present disclosure is stored in the memory 1702, and is controlled and executed by the processor 1701.

Program stored in the memory 1702 is used to instruct the processor 1701 to perform a load balancing method, including: receiving a first message that is sent by a client and that is used to request to establish a first TCP connection; sending the first message to a server; receiving a second message that is sent by the client and that is used to request to establish a second TCP connection, where the second TCP connection and the first TCP connection belong to a same MPTCP session, and the second message includes a token of the server; determining, based on the token of the server included in the second message, that a destination device of the second message is the server, and sending the second message to the server, in order to establish the second TCP connection between the client and the server.

Optionally, when determining, based on the token of the server included in the second message, that the destination device of the second message is the server, the processor 1701 is configured to: calculate a number of the server based on the token of the server; and determine that the destination device of the second message is the server corresponding to the number.

Optionally, when calculating the number of the server based on the token of the server, the processor 1701 is configured to calculate the number of the server based on the token of the server using a function negotiated between the load balancing device 1700 and the server.

It can be understood that the load balancing device 1700 in this embodiment may be configured to implement all functions of the load balancing device in the foregoing method embodiment. For a detailed implementation process, refer to the related description of the method performed by the load balancing device in the foregoing method embodiment. Details are not described herein again.

It can be understood that the processor 1701 in the load balancing device 1700 in this embodiment of this application may be a general-purpose central processing unit (CPU), a microprocessor, an application-specific integrated circuit (ASIC), or one or more integrated circuits configured to control program execution in the solutions of the present disclosure. One or more memories included in a computer system may be a read-only memory read-only memory (ROM) or another type of static storage device that is capable of storing static information and a static instruction, a random access memory random access memory (RAM) or another type of dynamic storage device that is capable of storing information and an instruction, or may be a magnetic disk memory. The memories are connected to the processor using a bus.

Functions of the receiver 1704 and the transmitter 1703 may be implemented using a transceiver, and the transceiver may be an entity module that is capable of implementing a transceiver function, in order to communicate with another device or another communications network.

The memory 1702, such as a RAM, stores an operating system and a program that is used to execute the solutions in the present disclosure. The operating system is a program that is used to control operating of another program and manage system resources.

The memory 1702, the transmitter 1703, and the receiver 1704 may be connected to the processor 1701 using a bus, or may be separately connected to the processor 1701 using a dedicated connection cable.

Code corresponding to the foregoing method is written permanently into a chip by designing programming for the processor 1701, such that when operating, the chip can perform an execution process of the load balancing device in the methods shown in FIG. 8 to FIG. 11.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

A person skilled in the art can make various modifications and variations to embodiments of this application without departing from the spirit and scope of this application. This application is intended to cover these modifications and variations of the embodiments of this application provided that they fall within the scope of protection defined by the following claims and their equivalent technologies.

What is claimed is:

1. A load balancing system, comprising:
a server;
a load balancing device; and
a client configured to:
  send, to the server through the load balancing device, a first message to request establishing a first Transmission Control Protocol (TCP) connection;
  receive, from the server in response to the first message, a response message comprising a key of the server and a first function, wherein the key of the server is calculated by the server based on a token of the server using the first function, wherein the token is calculated by the server based on a number of the server, and wherein the number of the server includes an identifier of the server;
  calculate the token based on the key and the first function; and
  send, to the load balancing device, a second message to request establishing a second TCP connection, wherein the response message comprises the key of the server and the first function, wherein the first function is to calculate the token of the server based on the key of the server, wherein the second message comprises the token, and wherein the second TCP connection and the first TCP connection belong to a same Multipath Transport Control Protocol (MPTCP) session,
wherein the server is configured to:
  receive the first message from the client through the load balancing device; and
  send the response message to the client, and
wherein the load balancing device is configured to:
  receive the first message from the client;
  send the first message to the server;
  receive the second message from the client;
  calculate the number of the server based on the token in the second message;
  determine that a destination device of the second message is the server according to an identifier of the server included in the number of the server; and
  send the second message to the server in order to establish the second TCP connection.

2. The system according to claim 1, wherein the server is further configured to calculate the token based on the number of the server using a second function.

3. The system according to claim 2, wherein the server and the load balancing device are further configured to negotiate a first key, and wherein the server is further configured to calculate the token based on the number and the first key using the second function.

4. The system according to claim 2, wherein the server and the load balancing device are further configured to negotiate the second function.

5. A load balancing method, comprising:
receiving, by a server, a first message from a client through a load balancing device, wherein the first message requests establishing a first Transmission Control Protocol (TCP) connection;
calculating, by the server, a token of the server based on a number of the server;
calculating, by the server, a key of the server based on the token using a first function, wherein the number of the server includes an identifier of the server; and
sending, by the server, a response message of the first message to the client, wherein the response message comprises the key of the server and the first function, wherein the first function is for the client to calculate the token of the server based on the key in order to establish, based on the token of the server, a second TCP connection to the server, and wherein the second TCP connection belongs to a same Multipath Transport Control Protocol (MPTCP) session as the first TCP connection.

6. The method according to claim 5, further comprising:
negotiating, by the server with the load balancing device, a second function;
and
calculating the key based on the token using the first function.

7. The method according to claim 6, further comprising:
negotiating, by the server with the load balancing device, a first key; and
calculating, by the server, the token based on the number and the first key using the second function.

8. A load balancing method, comprising:
sending, by a client to a server through a load balancing device, a first message to request establishing a first Transmission Control Protocol (TCP) connection;
receiving, by the client in response to the first message, a response message from the server, wherein the response message comprises a key of the server and a first function, wherein the first function is to calculate a token of the server based on the key, wherein the key of the server is calculated by the server based on a token of the server using the first function, wherein the token is calculated by the server based on a number of the server, and wherein the number of the server includes an identifier of the server;
calculating, by the client, the token based on the key; and
sending, to the load balancing device, a second message to request establishing a second TCP connection, wherein the second message comprises the token, wherein the token is for the load balancing device to determine that the server is a destination device of the second message in order to establish the second TCP connection between the client and the server, and wherein the second TCP connection and the first TCP connection belong to a same Multipath Transport Control Protocol (MPTCP) session.

9. A load balancing method, comprising:
receiving, by a load balancing device, a first message from a client to request establishing a first Transmission Control Protocol (TCP) connection;
sending, by the load balancing device, the first message to a server;
receiving, by the load balancing device, a second message from the client to request establishing a second TCP connection, wherein the second TCP connection and the first TCP connection belong to a same MPTCP session, and wherein the second message comprises a token of the server;
calculating the number of the server based on the token in the second message;
determining that a destination device of the second message is the server according to an identifier of the server included in the number of the server;
and
sending the second message to the server in order to establish the second TCP connection between the client and the server.

10. The method according to claim 9, further comprising:
negotiating, by the load balancing device with the server, a function, wherein calculating, by the load balancing device, the number comprises calculating, by the load balancing device, the number based on the token using the function.

11. A load balancing apparatus applied to a server, the load balancing apparatus comprising:
a receiver configured to receive a first message from a client, wherein the first message requests establishing a first Transmission Control Protocol (TCP) connection;
a processor coupled to the receiver and configured to:
calculate a token of the server based on a number of the server;
calculate a key of the server based on the token using a first function; and
generate a response message based on the first message, wherein the number of the server includes an identifier of the server; and
a transmitter coupled to the processor and configured to send the response message to the client, wherein the response message comprises the key of a server and the first function, and wherein the first function is for the client to calculate the token of the server based on the key of the server, in order to establish, based on the token of the server, a second TCP connection to the server, wherein the second TCP connection belongs to a same Multipath Transport Control Protocol (MPTCP) session as the first TCP connection.

12. The apparatus according to claim 11, wherein the processor is further configured to:
negotiate a second function with the server; and
calculate the token based on the number of the server using the second function.

13. The apparatus according to claim 12, wherein the processor is further configured to:
negotiate a first key with the server; and
calculate the token based on the number and the first key using the second function.

14. A load balancing apparatus applied to a client, the load balancing apparatus comprising:
a transmitter configured to send, to a server, a first message to request establishing a first Transmission Control Protocol (TCP) connection;
a receiver configured to receive a response message from the server in response to the first message, wherein the response message comprises a key of the server and a first function, wherein the first function is to calculate a token of the server based on the key, wherein the key of the server is calculated by the server based on a token of the server using the first function, wherein the token is calculated by the server based on a number of the server, and wherein the number of the server includes an identifier of the server; and a processor coupled to the transmitter and the receiver and configured to:
  calculate the token based on the key using the first function; and
  send, to the load balancing device, a second message to request establishing a second TCP connection, wherein the second message comprises the token, wherein the token is for the load balancing device to determine that the server is a destination device of the second message in order to establish the second TCP connection between the client and the server, and wherein the second TCP connection and the first TCP connection belong to a same Multipath Transport Control Protocol (MPTCP) session.

15. A load balancing apparatus, comprising:
a receiver configured to receive from a client a first message that requests establishing a first Transmission Control Protocol (TCP) connection;
a transmitter configured to send the first message to a server, wherein the receiver is further configured to receive from the client a second message that requests establishing a second TCP connection, wherein the second TCP connection and the first TCP connection belong to a same Multipath Transport Control Protocol (MPTCP) session, and wherein the second message comprises a token of the server; and
a processor coupled to the receiver and the transmitter and configured to:
  calculate a number of the server based on the token in the second message;
  determine that a destination device of the second message is the server according to an identifier of the server included in the number of the server; and
  send the second message to the server in order to establish the second TCP connection between the client and the server.

16. The load balancing apparatus according to claim 15, wherein the processor is further configured to further calculate the number based on the token using a function.

17. The load balancing apparatus according to claim 16, wherein the function is negotiated between the load balancing apparatus and the server.

18. The system according to claim 1, wherein the number of the server includes a second identifier of the MPTCP session.

19. The system according to claim 4, wherein the load balancing device is further configured to calculate the number of the server based on the token using the second function.

20. The system according to claim 1, wherein the first TCP connection is a primary MPTCP connection, and wherein the first message is a synchronization (SYN) message for establishing the primary MPTCP connection.

* * * * *